(12) United States Patent
Kamenetskaya et al.

(10) Patent No.: US 12,229,866 B2
(45) Date of Patent: Feb. 18, 2025

(54) BLOCK MATCHING WINDOW SEARCH INSTRUCTION USING A GRAPHICS PROCESSING UNIT (GPU) TEXTURE PIPELINE

(71) Applicant: QUALCOMM Incorporated, San Diego, CA (US)

(72) Inventors: Elina Kamenetskaya, Belmont, MA (US); Liang Li, San Diego, CA (US); Jonathan Wicks, Superior, CO (US); Samuel Benjamin Holmes, Sterling, MA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 18/155,679

(22) Filed: Jan. 17, 2023

(65) Prior Publication Data

US 2024/0242417 A1     Jul. 18, 2024

(51) Int. Cl.
G06T 15/00     (2011.01)
G06F 7/57      (2006.01)

(52) U.S. Cl.
CPC .............. G06T 15/005 (2013.01); G06F 7/57 (2013.01); G06T 2210/52 (2013.01)

(58) Field of Classification Search
None
See application file for complete search history.

(56) References Cited

U.S. PATENT DOCUMENTS

| | | | |
|---|---|---|---|
| 7,813,570 B2 | 10/2010 | Shen et al. | |
| 8,462,850 B2 | 6/2013 | Mohan et al. | |
| 9,319,708 B2 | 4/2016 | Hussain | |
| 9,788,011 B2 | 10/2017 | Rahman et al. | |
| 10,123,036 B2 | 11/2018 | Hussain et al. | |

(Continued)

OTHER PUBLICATIONS

Choudhury H.A., et al., "Survey on Block Matching Algorithms for Motion Estimation", 2014 International Conference on Communication and Signal Processing, IEEE, Apr. 3, 2014-Apr. 5, 2014, Apr. 3, 2014, pp. 36-40, XP032677807, Abstract, p. 36, paragraph I-p. 37, figure 1 p. 37, paragraph IV-p. 39 (5 pages).

(Continued)

*Primary Examiner* — Yanna Wu
(74) *Attorney, Agent, or Firm* — QUALCOMM Incorporated

(57) ABSTRACT

Aspects presented herein relate to methods and devices for graphics processing including an apparatus, e.g., a graphics processing unit (GPU). The apparatus may obtain a first indication of a first image including a set of first image sections with a plurality of first subsections and a second indication of a second image including a set of second image sections with a plurality of second subsections. The apparatus may also compare one first image section with one second image section. Further, the apparatus may calculate a magnitude of difference between one first subsection and each of the multiple second subsections. The apparatus may also output a third indication of at least one of: (1) a lowest magnitude of difference between the one first subsection and each of the multiple second subsections or (2) a set of coordinates for a second subsection that corresponds to the lowest magnitude of difference.

27 Claims, 10 Drawing Sheets

(56) References Cited

U.S. PATENT DOCUMENTS

2008/0037845 A1 2/2008 Deuerling-Zheng et al.
2015/0379676 A1* 12/2015 Girado ...................... G06T 7/40
 345/501

OTHER PUBLICATIONS

International Search Report and Written Opinion—PCT/US2023/081203—ISA/EPO—Apr. 12, 2024—14 pages.
Schwalb M., et al., "Fast Motion Estimation on Graphics Hardware for H.264 Video Encoding", IEEE Transactions on Multimedia, IEEE, USA, vol. 11, No. 1, Jan. 1, 2009, pp. 1-10, XP011240650, p. 3, paragraph IV-p. 6 (10 pages).

* cited by examiner

BLOCK MATCHING WINDOW SEARCH INSTRUCTION USING A GRAPHICS PROCESSING UNIT (GPU) TEXTURE PIPELINE

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform graphics processing. The apparatus may obtain a first indication of a first image including a set of first image sections and a second indication of a second image including a set of second image sections, where each of the set of first image sections includes a plurality of first subsections, and where each of the set of second image sections includes a plurality of second subsections. The apparatus may also compare one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section. Additionally, the apparatus may skip comparing the one first subsection in the plurality of first subsections with at least one second subsection in the plurality of second subsections. The apparatus may also calculate a magnitude of difference between the one first subsection of the plurality of first subsections and each of the multiple second subsections of the plurality of second subsections. Moreover, the apparatus may store, prior to outputting a third indication, at least one of: (1) a lowest magnitude of difference between the one first subsection of the plurality of first subsections and each of the multiple second subsections of the plurality of second subsections or (2) a set of coordinates for the second subsection in the multiple second subsections of the plurality of second subsections that corresponds to the lowest magnitude of difference. The apparatus may also output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
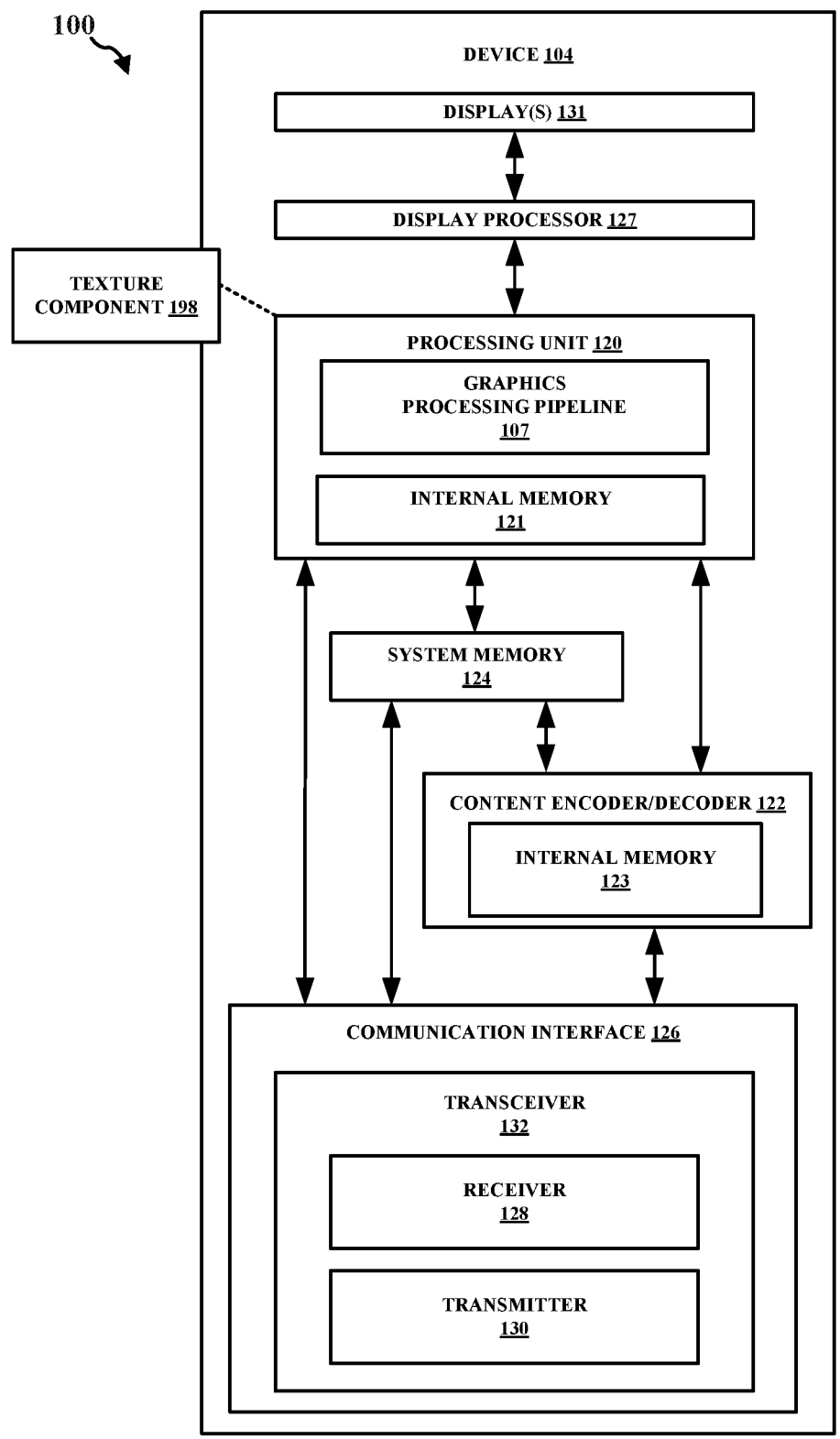
FIG. 1 is a block diagram that illustrates an example content generation system.

As indicated above, sum of absolute differences (SAD) and sum of square differences (SSD) are block matching operations used in graphics processing. For instance, SAD and SSD are used for graphics applications such as motion estimation, depth from stereo, and frame rate extrapolation used for time-warp. Support for SAD and SSD operations exists in graphics processing units (GPUs). In some aspects, SAD and SSD operations may use two images: a reference image and a target image. Given a selected block of the reference image, a sequence of SAD/SSD operations may be issued within a window of a target image. In some instances, the best result of the SAD/SSD operation (e.g., the SAD/SSD accumulation with the smallest difference) may mark the best estimation of where the selected block from the reference image was moved in the target image. However, running SAD and SSD operations may utilize a high amount of performance and/or power at a GPU. Based on the above, it may be beneficial to reduce the amount of performance and/or power utilized at a GPU while executing SAD and/or SSD operations. In some aspects, it may be beneficial to utilize different layers of processing for executing SAD and/or SSD operations at a GPU. Aspects of the present disclosure may utilize different layers of processing for executing block matching operations and/or SAD/SSD operations at a GPU. For instance, aspects presented herein may perform one layer of processing for executing block matching operations and/or SAD/SSD operations at a texture pipeline hardware (e.g., a texture processor (TP)) of a GPU. Moreover, aspects presented herein may execute multiple SAD and/or SSD operations simultaneously. That is, aspects of the present disclosure may execute multiple SAD and/or SSD operations in parallel. For example, aspects presented herein may execute multiple SAD/SSD operations in parallel by leveraging texture pipeline arithmetic logic units (ALUs).

Aspects of the present disclosure may include a number of benefits or advantages, such as reducing the amount of performance and/or power utilized at a GPU while executing certain operations (e.g., block matching operations and/or SAD/SSD operations). In some instances, aspects presented herein may generate an overall performance improvement at a GPU when executing certain operations (e.g., SAD and/or SSD operations). Aspects presented herein may also cause a power reduction at a GPU when executing certain operations (e.g., block matching operations and/or SAD/SSD operations). Further, aspects presented herein may cause a memory throughput reduction at a GPU when executing certain operations (e.g., block matching operations and/or SAD/SSD operations). Also, aspects presented herein may cause a cache hit reduction at a GPU when executing certain operations (e.g., block matching operations and/or SAD/SSD operations).

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term"graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a texture component 198 configured to obtain a first indication of a first image including a set of first image sections and a second indication of a second image including a set of second image sections, where each of the set of first image sections includes a plurality of first subsections, and where each of the set of second image sections includes a plurality of second subsections. The texture component 198 may also be configured to compare one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section. The texture component 198 may also be configured to skip comparing the one first subsection in the plurality of first subsections with at least one second subsection in the plurality of second subsections. The texture component 198 may also be configured to calculate a magnitude of difference between the one first subsection of the plurality of first subsections and each of the multiple second subsections of the plurality of second subsections. The texture component 198 may also be configured to store, prior to outputting a third indication, at least one of: (1) a lowest magnitude of difference between the one first subsection of the plurality of first subsections and each of the multiple second subsections of the plurality of second subsections or (2) a set of coordinates for the second subsection in the multiple second subsections of the plurality of second subsections that corresponds to the lowest magnitude of difference. The texture component 198 may also be configured to output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
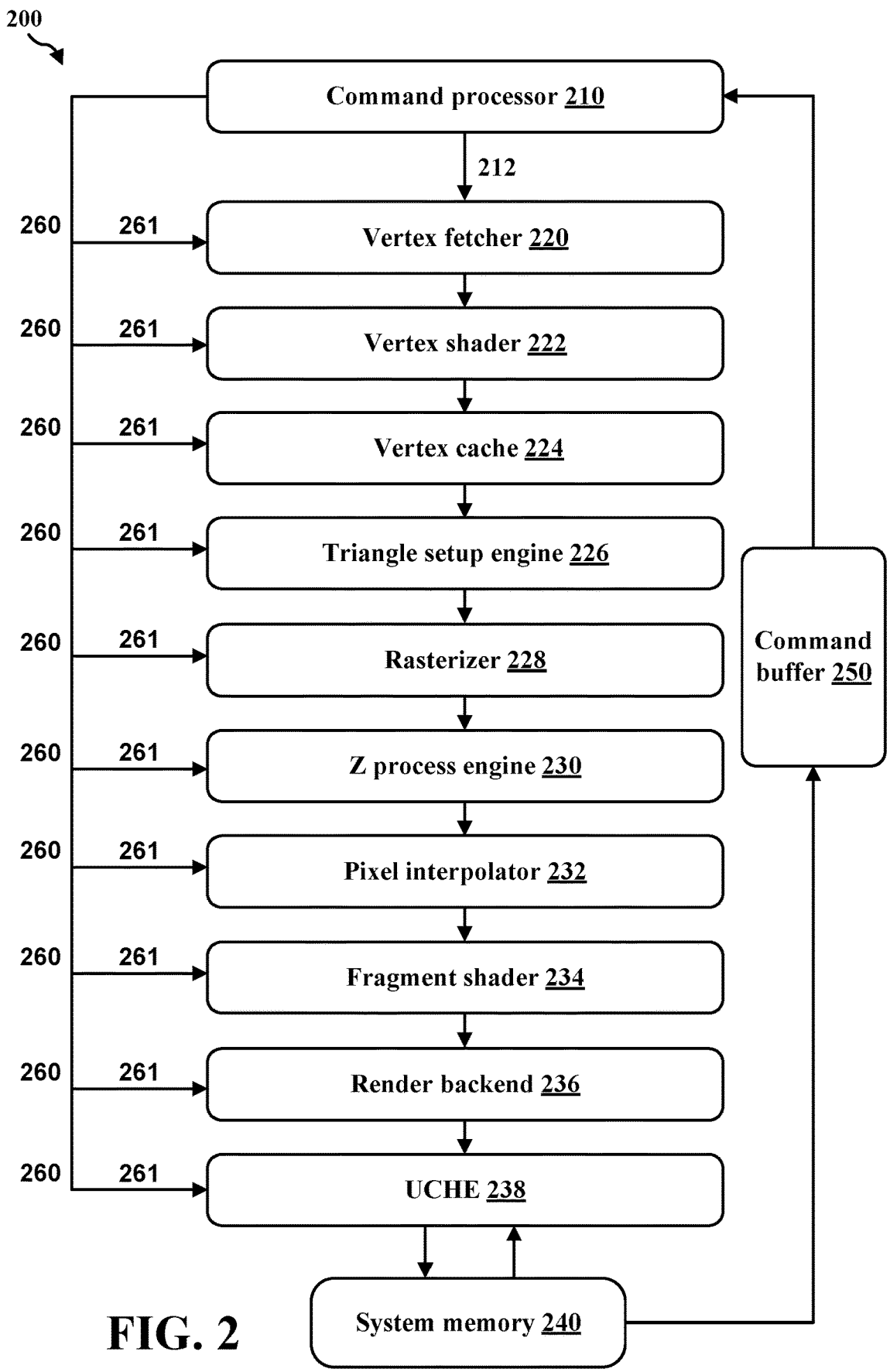
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
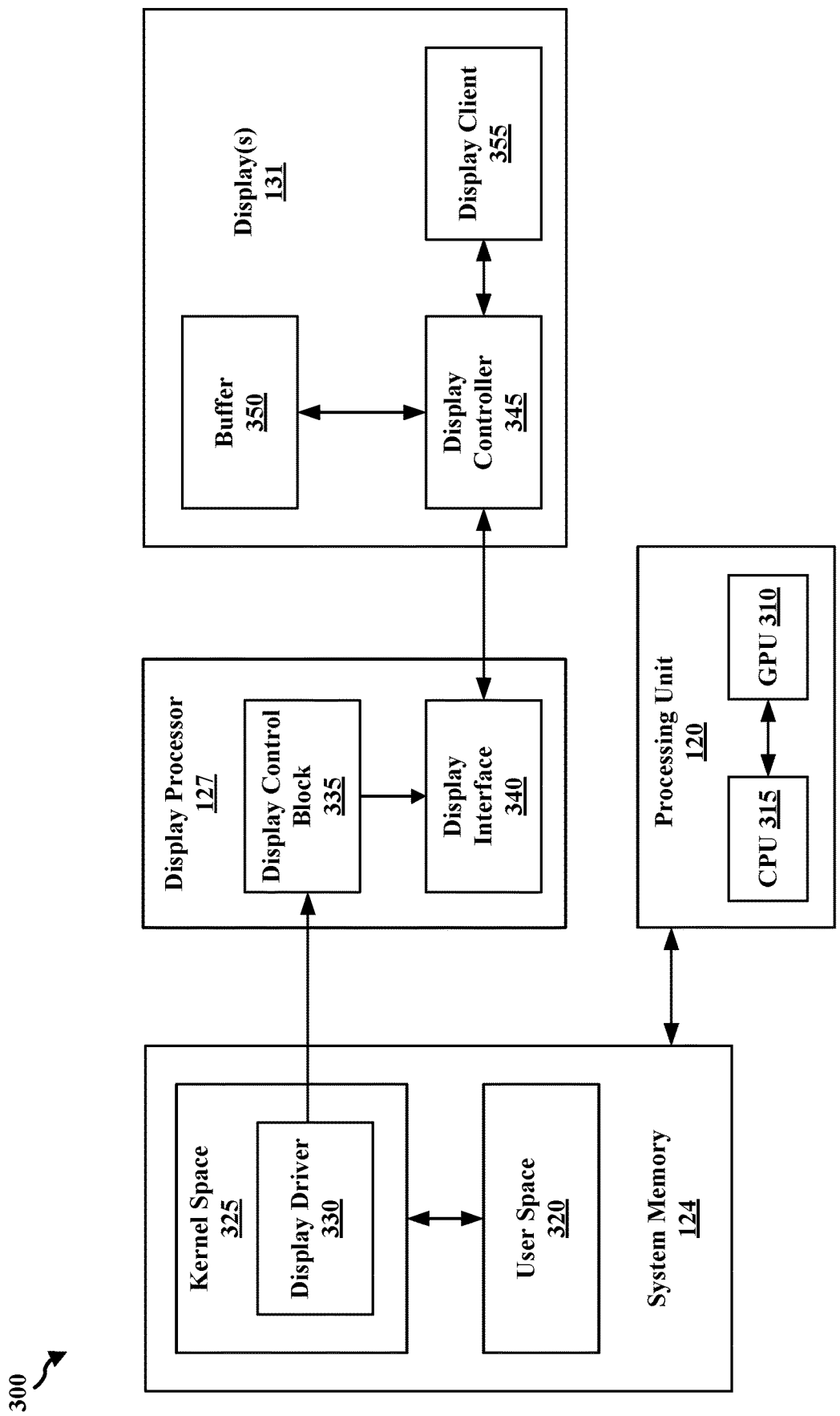
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some types of GPUs may include different types of pipelines, such as a graphics processing pipeline. Graphics processing pipelines may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units at a GPU. Shader units may be configured as a programmable pipeline of processing components. In some examples, a shader unit may be referred to as "shader processors" or "unified shaders," and may perform geometry, vertex, pixel, or other shading operations to render graphics. Shader units may include shader processors, each of which may include one or more components for fetching and decoding operations, one or more arithmetic logic units (ALUs) for carrying out arithmetic calculations, one or more memories, caches, and registers.

Additionally, a GPU may include a texture pipe (i.e., a texture pipeline). In some examples, a texture pipe may be included in shader units, but in other examples, texture pipe may also be outside of shader units. A texture pipeline may include one or more hardware units separate from shader processors in a GPU that are configured to operate on one or more texture data, such as texture data stored in a graphics memory to perform texture operations, such as texture filtering, and to output the result of operating on the one or more texture data. Shader processors may instruct a texture pipe to perform operations on texture data, and a texture pipe may send the results of operating on texture data to shader processor for further processing. For example, a texture pipe may be a dedicated set of hardware units that are dedicated to operating on texture data, such as dedicated to performing texture filtering on texture data or configured to calculate dot products of texture data and the like. The texture data may be a one-dimensional, two-dimensional, or three-dimensional texture, or a one-dimensional, two-dimensional, or three-dimensional array of textures. In some examples, a texture may be an object that contains one or more images, where pixels of the one or more images may be referred to as texture pixels (i.e., texels). Texture data may include one or multiple textures. In one example, texture data may include an array of texture elements, also known as texels, which contain color and alpha values for the texture data. In some examples, texture data may include one or more quads, which may be a block of texels (e.g., four texels). In some examples, texture data may be a two-dimensional image that a GPU maps to three-dimensional graphics. For instance, a pixel in a texture data, also referred to as a texel, may be identified by a (u, v) coordinate, and texture data may be made up of an array of texels. In some examples, a GPU may map the (u, v) coordinates of the array of texels of a texture data to (x, y, z, w) coordinates. A GPU may also perform additional graphics processing on the texels of a texture data (e.g., additional graphics processing on the red-green-blue (RGB) values of the texels). In some examples, a block may include one or more texels, so that a texture may include multiple blocks that each includes one or more texels. Also, in some examples, a block may include a quad, which may be a block of four texels.

A GPU may designate shader units to perform a variety of shading operations such as vertex shading, hull shading, domain shading, geometry shading, pixel shading, and the like, by sending commands to shader units to execute one or more of a vertex shader stage, a hull shader stage, a domain shader stage, a geometry shader stage, and a pixel shader stage in a graphics processing pipeline. In some examples, a GPU driver may include a compiler configured to compile one or more shader programs, and to download the compiled shader programs onto one or more programmable shader units contained within GPU. The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of shader units within the GPU. For example, the shader programs may include vertex shader programs that may be executed by shader units to perform the functions of a vertex shader stage, hull shader programs that may be executed by shader units to perform the functions of a hull shader stage, domain shader programs that may be executed by the shader unit to perform the functions of a domain shader stage, geometry shader programs that may be executed by the shader unit to perform the functions of a geometry shader stage, and/or pixel shader programs that may be executed by shader units to perform the functions of a pixel shader. A vertex shader program may control the execution of a programmable vertex shader unit or a unified shader unit, and include instructions that specify one or more per-vertex operations. Additionally, graphics memory may be on-chip storage or memory that is physically integrated into the integrated circuit of a GPU. Because graphics memory is on-chip, a GPU may be able to read values from or write values to graphics memory more quickly than reading values from or writing values to a system memory via a system bus. Also, graphics memory may store different types of data, such as texture data. As described above, texture data may include texture elements, also referred to as texture pixels (i.e., texels), which may be the fundamental units of texture space.

As indicated above, in some examples, shader units may include shader processors as well as a texture pipe. The texture pipe may operate concurrently with shader processors to operate on texture data. For example, shader processors may perform operations of a graphics pipeline while a texture pipe operates concurrently to operate on texture data. In another example, a shader processor may operate on some portion of texture data that has already been previously processed by a texture pipe, as the texture pipe concurrently operates on some other portion of texture data. Shader processors may offload work onto the texture pipe, including sending operations to the texture pipe or programming the texture pipe to perform image processing operations, so that the texture pipe may operate on texture data while shader processors concurrently perform graphics rendering operations, and the texture pipe may send the result of the image processing operations on texture data, such as texels of texture data that result from the processing by the texture pipe, to shader processors. For example, shader processors may execute shader programs to perform image processing on images and textures stored in graphics memory.

As part of performing image processing, the shader programs may include instructions to perform certain image processing operations which may be offloaded to the texture pipe. For example, those instructions to perform image processing operations may include instructions to perform block-based operations, as described throughout this disclosure. A GPU, or components of a GPU such as a high level sequencer, may determine, based on the instructions, that shader processors may be able to offload those block-based operations to the texture pipe, and may enable shader processors to send instructions to a texture pipe to perform specified block-based operations on specified texture data. In some examples, shader processors may send instructions per quad (e.g., four texels) to a texture pipe to perform a block-base d operation on the respective quad. The texture pipe may, based on the instructions received from shader processors, retrieve the specified texture data, perform the specified block-based operations on the specified texture data, and return the results of performing the specified block-based operations to the shader processors. In this manner, by offloading certain image processing operations onto a texture pipe, shader processors may save processing cycles by receiving texels and/or other graphics data from texture pipe that have already been operated on by texture pipe. Furthermore, off-loading texture processing to a texture pipe may enable better scalability of shader units. In some examples, rather than sending processed texels to a shader processor, the texture pipe may also access graphics memory to store the results of the operations performed by the texture pipe into graphics memory, and shader processors may be able to access the results stored in graphics memory.

Figure 4:
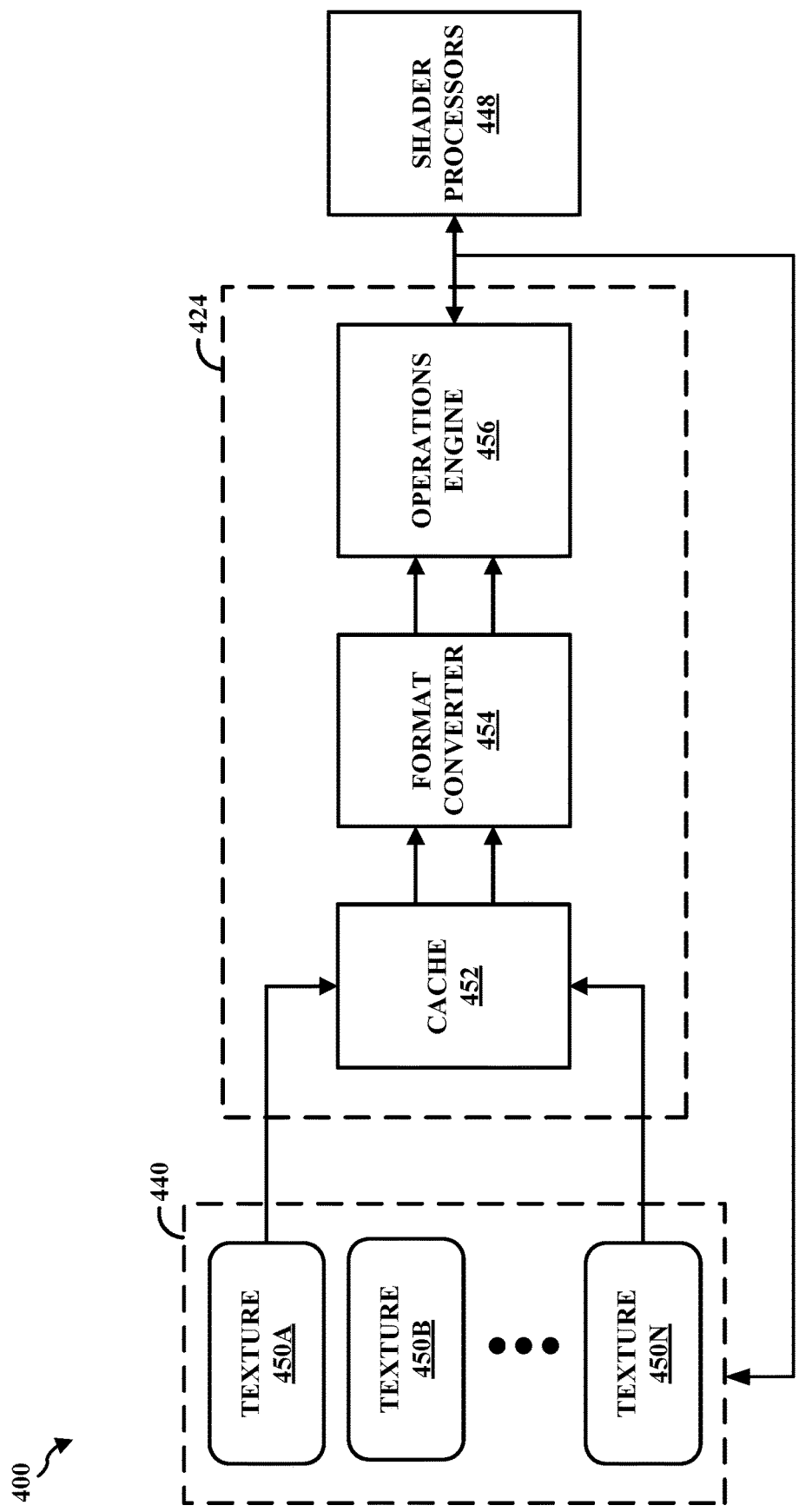
FIG. 4 is a diagram illustrating an example of a texture pipe at a GPU.

FIG. 4 is a diagram 400 illustrating an example of a texture pipe at a GPU. More specifically, diagram 400 illustrates texture pipe 424 and graphics memory 440. Texture pipe 424, in some examples, may be quad-based, such that texture pipe 424 may read/cache/process or otherwise operate on sets of four texels at a time. For example, texture pipe 424 may perform an operation on texture data (e.g., texture data 450A, texture data 450B, . . . , texture data 450N) that includes a quad (four texels), such that texture pipe 424 may operate on a total of eight texels at a time. First texture data (e.g., texture data 450A) may differ in size from second texture data (e.g., texture data 450B), such that the first and second texture data may include different amount of texels. For example, the first texture data may include one quad of texels while the second texture data may include eight quads of texels. As shown in FIG. 4, texture pipe 424 may include cache 452, which may be a level one (L1) cache, which may store texture data retrieved from graphics memory 440. Cache 452 may be configured to store texture data (e.g., store two pieces of texture data 450A and 450B) retrieved from graphics memory 440 at the same. By storing two textures at the same time, cache 452 may enable texture pipe 424 to perform basic image processing operations between two pieces of texture data rather than limiting texture pipe 424 to performing dot products between a texture and a set of weights. In some examples, texture data that is cached by cache 452 may include one or more convolution weights, such as a weight matrix, which may be cached in cache 452. Because some image processing algorithms performed by operations engine 456 may use the same block of texels (e.g., the same quad of texels) over and over to process another block of texels, cache 452 may cache such blocks of texels, thereby more efficiently utilizing memory bandwidth. For example, texture pipe 424 may perform a block-matching operation, such as a sum of absolute differences (SAD) operation or a sum of squared differences (SSD) operation, to find the block of texels that best matches a given reference template within a pre-defined search area. In one example, texture pipe 424 may more efficiently utilize memory bandwidth by caching the reference block in cache 452 such that texture pipe 424 may compare the same reference block against a plurality of different blocks to determine whether a particular block of the plurality of different blocks matches the reference block. Texture pipe 424 may also include format converter 454, which may convert the format of the texels of texture data. For example, format converter 454 may convert between one or more of 16-bit floating point textures, 32-bit floating point textures, signed normalized integer textures, unsigned normalized integer textures, red green blue alpha (RGBA) color space, red green blue (RGB) color space, red green (RG) color space, red (R) color space, luminance (Y) chrominance (UV) (YUV) color space, and the like. Format converter 454 may also decompress texture data compressed via compression schemes such as adaptive scalable texture compression (ASTC), BCx, ETCx, EACx, MIPI, and the like. In this way, format converter 454 may be able to decode image formats of texture data before operations engine 456 processes the quads of texture data. As such, format converter 454 may be able to decode texture data before it is processed by operations engine 456.

In some examples, operations engine 456 may further include another cache (not shown), which may be a memory cache that caches the format-converted textures resulting from format converter 454. Texture pipe 424 may also include operations engine 456. Operations engine 456 may include one or more arithmetic logic units (ALUs), as well as other components that may perform one or more operations on texels of texture data. For example, the ALUs of operations engine 456 may perform arithmetic operations such as addition, subtraction, multiplication, and division, as well as bitwise operations, exponential operations, and the like on any set of texels of texture data in order to perform operations on texture data (e.g., texture data 450A and texture data 450B). Operations engine 456 may perform several types of operations on texture data, which may include dot product operations, sum of absolute differences (SAD) operations, sum of squared differences (SSD) operations, one-dimensional and two-dimensional convolution and correlation operations, image thresholding operations, determining areas of objects, block histogram, frame difference, frame addition, minimum or maximum of a block, and the like. If operations engine 456 includes another cache, operations engine 456 may retrieve the format-converted textures cached in the cache to perform the retrieved format-converted textures of the operations listed above. Operations engine 456 may also perform dot product operations on texture data. First texture data 450A and second texture data 450B may each include a block of texels, such as a quad of texels. A dot product operation may include multiplying each texel in first texture data 450A of second texture data 450B and summing the product of the texels from first texture data 450A or second texture data 450B. The dot product operation may be useful, for example, for performing texture blending for adding shading to a geometry. Texture pipe 424 may output the result of performing the dot product operation of texture data 450A and texture data 450B to, for example, shader processors 448.

Operations engine 456 may also perform convolution and correlation operations on texture data. A convolution operation may include multiplying each texel in texture data 450A with weights included in texture data 450B and summing the product of the texels and weights from the texture data 450A and 450B. In this example, weights for performing the convolution can be stored as texture data that may be stored in graphics memory 440 and cached in cache 452. Texture pipe 424 may also perform several and different convolutions by selecting different textures stored in graphics memory 440. For example, given different types of texture data, texture pipe 424 may select one of these types of texture data to use as weights with which to convolute texture data 450A. Texture pipe 424 may select texture data stored in graphics memory 440 to receive the selected texture data and store the selected texture data in cache 452. Operations engine 456 may then perform a convolution operation on texture data 450A and the selected texture data. Operations engine 456 may also perform a sum of absolute differences (SAD) operation on texture data 450A and texture data 450B. The SAD operation may perform block-matching between two images or between a reference template-window and an image to measure the similarity between sets of texture data. Operations engine 456 may perform the SAD operation on texture data 450A and texture data 450B by taking the absolute difference between texels in texture data 450A with corresponding texels in texture data 450B, and summing the differences to create a simple metric of block similarity. The SAD operation may be used for a variety of purposes, such as object recognition, the generation of disparity maps for stereo images, motion estimation for video compression, and the like. Operations engine 456 may also perform a sum of square differences (SSD) operation on texture data. Similar to the SAD operation, the SSD operation may be another approach to perform block-matching between sets of texture data. Operations engine 456 may perform the SSD operation on texture data 450A and texture data 450B by taking the square of the difference between texels in texture data 450A with corresponding texels in texture data 450B, and summing the differences to create a simple metric of block similarity. Similar to the SAD operation, the SSD operation may also be used for a variety of purposes, such as object recognition, the generation of disparity maps for stereo images, motion estimation for video compression, and the like.

Operations engine 456 may also determine the area of an object by counting all the pixels contained in the object. For example, given some texture data (e.g., texture data 450A), operations engine 456 may sum all of the pixels in the texture data. In some examples, operations engine 456 may pre-process texture data 450A by performing image thresholding on texture data, so each texel may correspond to a value of either '0' or '1.' Operations engine 456 may also perform image thresholding on texture data. Texture pipe 424 may receive a constant, such as from shader processors 448. Operations engine 456 may determine, for each texel in texture data 450A, whether the value of the texel is larger than the constant. In some aspects, for each texel, the operations engine 456 may output the value of the texel if the value of the texel is larger than the constant, or the operations engine 456 may output '0' if the value of the texel is not larger than the constant. Texture pipe 424 may be able to output more than one result of operations engine 456 based at least in part on the image processing algorithm performed by texture pipe 424. For example, if texture pipe 424 combines all texels of texture data using certain operations, such as a two-dimensional convolution operation, texture pipe 424 may output a single two-dimensional convolution output. If texture pipe 424 combines row-wise texels using certain operations, such as a one-dimensional convolution operation, texture pipe 424 may output two one-dimensional convolution outputs. If texture pipe 424 combines pairwise texels using certain operations, such as frame image difference operations, texture pipe 424 may output four frame difference outputs.

As indicated above, operations engine 456 may be used by texture pipe 424 to perform image filtering operations. Besides performing image filtering operations, including the convolution, block matching, SAD, and correlation operations described above, texture pipe 424 may use operations engine 456 to perform many other operations. In some examples, operations engine 456 may be used by texture pipe 424 to perform simple blending operations. In some examples, operations engine 456 may be used by texture pipe 424 to perform morphological operations, which may be image processing operations that process images based on shapes. In a morphological operation, the value of each pixel in the output image may be based on a comparison of the corresponding pixel in the input image with its neighbors. A morphological operation that is sensitive to specific shapes in the input image may be constructed by selecting the size and shape of the neighborhood. Some examples of these operations may include dilation operations and erosion operations. In some examples, operations engine 456 may also be used by texture pipe 424 to perform pixelwise logical operations. Some examples of these operations may include general operations such as relational operations (e.g., bigger than, smaller than, equal to), and operations, or operations, exclusive or operations, and the like. In some examples, pixelwise logical operations may include simple thresholding operations, as described above. In some examples, pixelwise logical operations may include per-pixel thresholding. In some examples, operations engine 456 may also be used by texture pipe 424 to perform geometric property operations. Some examples of these operations may include determining the size or area, determining a position, determining an orientation, determining an X projection, and determining a Y projection. In some examples, operations engine 456 may also be used by texture pipe 424 to perform histogram operations. In addition to the operations described above, texture pipe 424 may also perform any other operations related to graphics processing, image processing, video post-processing, camera image processing, computer vision, and the like. Furthermore, although the above examples include four texel-by-four texel examples, operations engine 456 may, in some examples, be usable to perform the operations disclosed herein for up to N×N block operations, where N may be any positive integer. For example, operations engine 456 may be usable to perform 8×8 block operations, 32×32 block operations, and the like.

Figure 5:
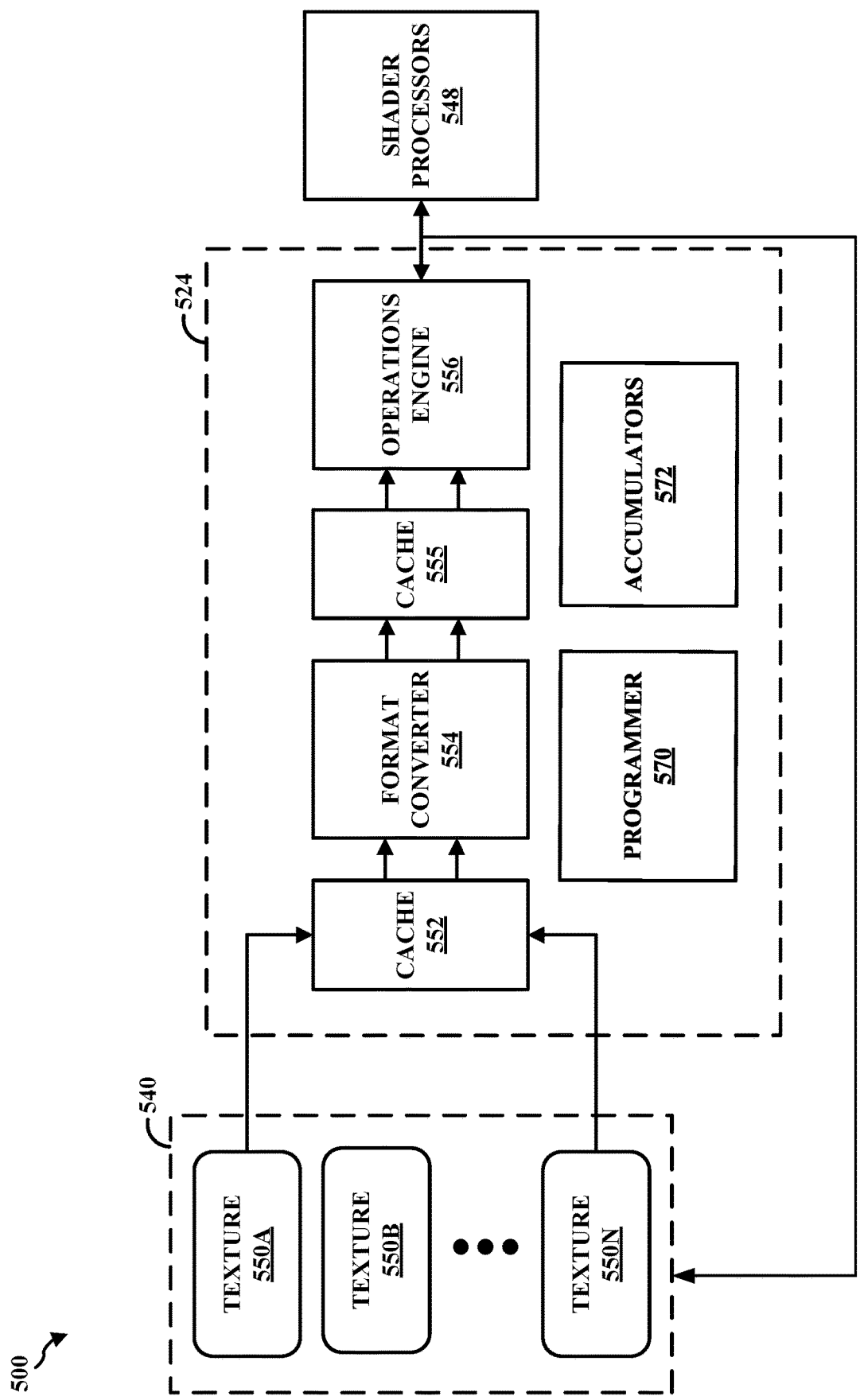
FIG. 5 is a diagram illustrating an example of a texture pipe at a GPU.

FIG. 5 is a diagram 500 illustrating an example texture pipe that may act as an image engine. More specifically, diagram 500 illustrates graphics memory 540 and texture pipe 524 including cache 552, cache 555, format converter 554, and operations engine 556. As shown in FIG. 5, texture pipe 524 may include all of the components of texture pipe 424 in FIG. 4, as well as texture pipe programmer 570 and accumulators 572. Shader processors 548 may be able to program texture pipe 524 with start/end texture data (e.g., texture data 550A, texture data 550B, . . . , texture data 550N) coordinates and offsets, and texture pipe programmer 570 may store the instructions from shader processors 548 and may program texture pipe 524 based on the programming from shader processors 548. Texture pipe programmer 570 may also program texture pipe 524 to traverse/loop through texture data. Texture pipe programmer 570 may also receive instructions from a CPU, via a GPU driver, and may program texture pipe 524 based on the received instructions. Texture pipe 524 may also include accumulators 572 to store partial (e.g., per quad) results output by operations engine 556. Texture pipe 524 may be able to write the result of operations performed by operations engine 556 directly to memory, such as graphics memory 540, in addition to being able to output the results to shader processors 548, thereby being able to bypass shader processors 548. By acting as a processing engine, shader processors 548 may instruct texture pipe 524 to perform an image processing operation between two images (e.g., perform two dimensional convolution between two blocks of the respective two images) and in the meantime the shader processors 548 may be able to concurrently perform other tasks such as processing texels of other texel data outputted from texture pipe 524 to shader processors 548 while texture pipe 524 performs the image processing operation. Additionally, texture pipe 524 may output the results of performing the image processing operation to shader processors 548 for further processing.

As indicated above, sum of absolute differences (SAD) and sum of square differences (SSD) are block matching operations used in graphics processing. For instance, SAD and SSD are used for graphics applications such as motion estimation, depth from stereo, and frame rate extrapolation used for time-warp. Support for SAD and SSD operations exists in graphics processing units (GPUs). In some aspects, SAD and SSD operations may use two images: a reference image and a target image. Given a selected block of the reference image, a sequence of SAD/SSD operations may be issued within a window of a target image. In some instances, the best result of the SAD/SSD operation (e.g., the SAD/SSD accumulation with the smallest difference) may mark the best estimation of where the selected block from the reference image was moved in the target image. However, running SAD and SSD operations may utilize a high amount of performance and/or power at a GPU. Based on the above, it may be beneficial to reduce the amount of performance and/or power utilized at a GPU while executing SAD and/or SSD operations. In some aspects, it may be beneficial to utilize different layers of processing for executing SAD and/or SSD operations at a GPU. For instance, it may be beneficial to perform one layer of processing for executing SAD and/or SSD operations at a texture pipeline (e.g., a texture processor (TP)) hardware of a GPU. Also, it may be beneficial to execute multiple SAD and/or SSD operations simultaneously or execute multiple SAD and/or SSD operations in parallel. For example, it may be beneficial to execute multiple SAD/SSD operations in parallel by leveraging texture pipeline ALUs.

Aspects of the present disclosure may reduce the amount of performance and/or power utilized at a GPU while executing certain operations (e.g., block matching operations and/or SAD/SSD operations). In some instances, aspects of the present disclosure may utilize different layers of processing for executing block matching operations and/or SAD/SSD operations at a GPU. For instance, aspects presented herein may perform one layer of processing for executing block matching operations and/or SAD/SSD operations at a texture pipeline hardware (e.g., a texture processor (TP)) of a GPU. Moreover, aspects presented herein may execute multiple SAD and/or SSD operations simultaneously. That is, aspects of the present disclosure may execute multiple SAD and/or SSD operations in parallel. For example, aspects presented herein may execute multiple SAD/SSD operations in parallel by leveraging texture pipeline arithmetic logic units (ALUs). By doing so, aspects presented herein may generate an overall performance improvement at a GPU when executing certain operations (e.g., SAD and/or SSD operations). Aspects presented herein may also cause a power reduction at a GPU when executing certain operations (e.g., block matching operations and/or SAD/SSD operations). Further, aspects presented herein may cause a memory throughput reduction at a GPU when executing certain operations (e.g., block matching operations and/or SAD/SSD operations). Also, aspects presented herein may cause a cache hit reduction at a GPU when executing certain operations (e.g., block matching operations and/or SAD/SSD operations).

In some instances, aspects of the present disclosure may add another level of processing to certain types of operations (e.g., block matching operations and/or SAD/SSD operations). For instance, aspects of the present disclosure may add a second level/layer of processing (e.g., a search window) to a first level/layer of operations (e.g., block matching operations and/or SAD/SSD operations). In some instances, the second level/layer of processing may be performed within shader processor (SP) code at a GPU. Aspects presented herein may perform this level/layer of processing in the texture pipeline hardware (e.g., a texture processor (TP)) of the GPU. By moving this processing from one location of a GPU (e.g., a shader processor (SP) or SP code) to another location of a GPU (e.g., a texture processor (TP) or the texture pipeline hardware), aspects presented herein may achieve performance and power benefits at the GPU. Aspects of the present disclosure may implement a new second-level window search instruction that improves the usability and performance of first-level operations (e.g., block matching operations and/or SAD/SSD operations). By doing so, aspects presented herein may accommodate a number of different use cases (e.g., motion estimation, depth from stereo, frame rate extrapolation used for time-warp, etc.).

Additionally, aspects presented herein may execute multiple operations (e.g., SAD/SSD operations) of a GPU at the same time (e.g., at a TP or texture pipeline hardware). For instance, aspects of the present disclosure may execute multiple operations (e.g., block matching operations and/or SAD/SSD operations) of a GPU in parallel (e.g., at a TP or texture pipeline hardware). In order to do so, aspects presented herein may leverage a number of different ALU components (e.g., components of TP ALUs). For instance, aspects presented herein may leverage a number of different color components of TP ALUs (e.g., four color components of TP ALUs). Aspects presented herein may also decode or unroll certain search instructions to a memory or cache at the texture pipeline of a GPU. For example, aspects presented herein may decode/unroll a search loop in an order-friendly fashion to the TP internal data caching structure of a GPU.

Figure 6A:
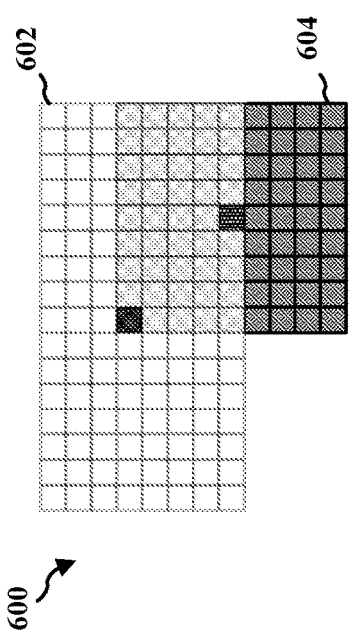
FIG. 6A is a diagram illustrating an example of a block matching feature.
Figure 6B:
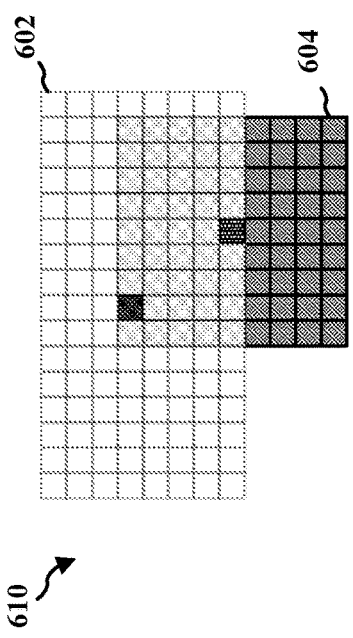
FIG. 6B is a diagram illustrating an example of a block matching feature.
Figure 6C:
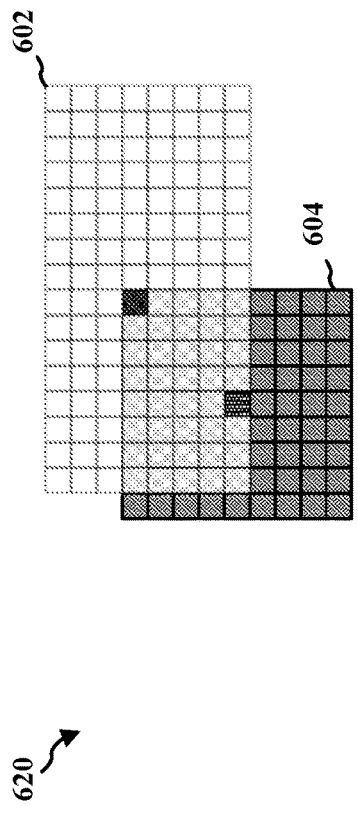
FIG. 6C is a diagram illustrating an example of a block matching feature.

FIG. 6A, FIG. 6B, and FIG. 6C include diagram 600, diagram 610, and diagram 620, respectively, illustrating examples of a block matching feature. More specifically, diagrams 600, 610, and 620 illustrate different steps of a block matching operation. As shown in FIGS. 6A-6C, diagrams 600, 610, 620 include reference image 602 and target image 604 for use in a block matching operation. FIGS. 6A-6C depict that, during the block matching operation, one subsection or block in reference image 602 (e.g., the black block in reference image 602) is compared with a corresponding subsection or block in the target image 604 (the block in target image 604 that overlaps with the black block in reference image 602). That is, one subsection of the reference image 602 is compared with (i.e., moved over) a corresponding subsection in target image 604 in order to determine whether the subsections are similar.

As shown in FIGS. 6A-6C, aspects presented herein may perform a block matching operation for a first image section (e.g., a subsection in reference image 602) with a second image section (e.g., a subsection in target image 604). For example, during the block matching operation, aspects presented herein may compare a first image block with a second image block, such as by positioning the first image block at different locations to be compared to the second image block. As depicted in FIGS. 6A-6C, the black block in the reference image 602 (e.g., the first image block) is moved along (i.e., compared with) different locations of the target image 604 (e.g., the second image block). That is, one subsection in the reference image 602 (e.g., the first image block) is compared with multiple subsections in the target image 604 (e.g., the second image block). Additionally, during the block matching procedure, aspects presented herein may calculate a magnitude of difference between one subsection of the first image block and each of the multiple subsections of the second image block. In some aspects, calculating the magnitude of difference may include: performing a sum of absolute differences (SAD) operation or a sum of squared differences (SSD) operation between the subsections of the first image block and the second image block. That is, aspects presented herein may perform a sum of absolute differences (SAD) operation or a sum of squared differences (SSD) operation between the subsections of the first image block (e.g., reference image 602) and the second image block (e.g., target image 604).

FIGS. 6A-6C represent a block matching procedure that includes instructions for determining if a piece of a reference image (e.g., the black block in reference image 602) is similar to a corresponding piece of a target image (e.g., the corresponding block in target image 604 which is overlapped by the black block in reference image 602). So there are two images (e.g., reference image 602 and target image 604) that are operating as a reference and target in this type of block matching application. In some instances, these types of block matching operations may be used to determine the displacement of how a particular object has moved within a scene. For instance, if the reference image (e.g., reference image 602) includes a particular object (e.g., a ball), then the block matching operation may attempt to determine how the object (e.g., a ball) moved in the target image (target image 604). For example, the block matching operation (e.g., a low-level SAD/SSD operation) may take an object within the reference image (e.g., a ball), then form a square around the object, and then take a square piece of the target image and determine whether the two objects in the reference image and the target image are similar. In some instances, this operation may be performed by differencing pixel-by-pixel or texel-by-texel across the two images. The smaller the difference determined by the block matching operation (e.g., a SAD/SSD operation) for each object in the images, the more likely that these two images are the same image. So this block matching operation (e.g., a low-level SAD/SSD operation) may take a single block in the reference image and compare it to a single block in the target image.

Additionally, aspects presented herein may utilize instructions or code to perform the aforementioned operations (e.g., a block matching operation or low-level SAD/SSD operation). For instance, aspects presented herein may include instructions or code to execute an existing first-level of block matching operations. Also, aspects presented herein may utilize instructions or code to add a new second-level of instructions, such as a level for retracing or looping across a search window (e.g., two-dimensional (2D) search window). This search window may be a typical search area on which a block matching operation is performed. Moreover, aspects of the present disclosure may include instructions or code to determine a most accurate selection (i.e., a winning selection) in the block matching procedure in order to select the best matching result (i.e., subsection or block in the image) from the compared images (i.e., a reference image and target image).

Aspects presented herein may utilize a number of types of instructions or code in order to perform the aforementioned operations. In some instances, aspects presented herein may utilize the following instructions or pseudo-code:

```
for (int loopX=-4; loopX<=4; loopX=loopX+stepSize) {
    for (int loopY=-4; loopY<=4; loopY=loopY+stepSize)
    {
        thisSAD=blockMatchSAD(targetImage,
            targetImageCoordinates+{loopX, loopY},
            referenceImage,
            referenceImageCoordinates,
            referenceBlockSize);
        if (sad<bestMatchSAD) {
        bestMatchSAD=thisSAD;
        bestMatchCoord={loopX, loopY};
        }
    }
}
```

In the pseudo-code above, the middle sections of the code (i.e., the code section starting with "thisSAD=blockMatchSAD(targetImage,") show the existing first-level block-matching operation. The top sections of the code (i.e., the code section with the two "for" loops) add a new second-level of instructions, such as a level for retracing or looping across a search window (e.g., two-dimensional (2D) search window). This search window may be a typical search area on which block matching operation is performed. The bottom sections of the code (i.e., the code section starting with "if (sad<bestMatchSAD)") show a winning selection to elect the best matching result. For instance, a most accurate selection (i.e., a winning selection) in the block matching procedure may be determined in order to select the best matching result (i.e., subsection or block in the image) from the compared images (i.e., a reference image and target image).

Additionally, the aforementioned pseudo-code may be depicted using the example images in FIGS. 6A-6C. For example, target image 604 may be a search window (e.g., a 9×9 search window) and reference image 602 may be a SAD block (e.g., 16×8 SAD blocks). That is, the target image 604 may be a search window that is 9 block wide and 9 block high, and reference image 602 may be a SAD block that is 16 blocks wide and 8 blocks high. Indeed, FIGS. 6A-6C show how the reference image 602 (e.g., 16×8 SAD blocks) is overlaid at various positions on the target image 604 (e.g., a 9×9 search window). For instance, in FIG. 6A, the black block of reference image 602 is overlaid at position (0,0) of the target image 604. In FIG. 6B, the black block of reference image 602 is overlaid at position (1,0) of the target image 604. In FIG. 6C, the black block of reference image 602 is overlaid at position (8,0) of the target image 604. As implied in FIGS. 6A-6C, this search (i.e., overlaying reference image 602 on target image 604) may continue to the other rows of the window for all of the subsections/blocks in target image 604 (e.g., a total of 81 SAD operations).

As shown in FIGS. 6A-6C, aspects of the present disclosure may utilize a block matching operation as a loop across a search window. For a certain search window size of target image 604 (e.g., a 9×9 search window), a number of block matching computations may be performed using reference image 602 (e.g., a 16×8 SAD window of blocks). The block matching operation may compare each of the blocks/subsections in target image 604 with each corresponding block/subsection in reference image 602. Aspects presented herein may store the most accurate or best result. For example, aspects presented herein may store the smallest value or the smallest difference in the block matching comparison. So aspects presented herein may group the entire block matching operation together. For instance, aspects presented herein may utilize a loop in shader code as a macro instruction for all of the block matching operations. That is, aspects presented herein may include a loop in shader code (e.g., for block matching operations or SAD/SSD operations) that will be executed multiple times across this search window. For example, aspects presented herein may utilize instructions or code to compare each block/subsection in a search window (e.g., target image 604) with each corresponding block/subsection in a block matching block (e.g., reference image 602).

Aspects presented herein may utilize GPU hardware (e.g., a TP or texture pipeline in a GPU) to return the most accurate value in the block matching operation. For instance, aspects presented herein may utilize GPU hardware (e.g., a TP or texture pipeline in a GPU) to obtain the smallest difference (i.e., the best value) in the block matching operation between the reference image and the target image using the search window. Aspects herein may move these calculations for the block matching operation to more appropriate locations in a GPU (e.g., a TP or texture pipeline in a GPU). That is, aspects presented herein may move the instructions from the SP to a TP or texture pipeline in a GPU. As these instructions are moved to the TP or texture pipeline hardware, fewer instructions may need to be executed on the shader core of the GPU. This may free up the SP or shader core to perform other operations. Additionally, aspects presented herein may improve the performance of a GPU (e.g., up to four times) because of the manner in which these instructions are mapped at the GPU. For instance, these instructions may fully utilize all of the ALU capability in the TP because they are being performed simultaneously or in parallel. Indeed, aspects presented herein may parallelize the performance of the instructions with ALUs of the TP, which may result in a corresponding performance benefit (e.g., up to a 4× performance boost). So being able to better map these block matching operations onto the ALUs of the TP may allow aspects presented herein to fully utilize the future operations of the block matching search window. Moreover, aspects presented herein may improve memory efficiency at a GPU by unrolling a search loop in an order-friendly fashion to the internal cache structure. That is, aspects presented herein may improve the order of operations of the block matching operation. So aspects presented herein may perform the block matching operation in a manner that is cache friendly at the GPU. As such, aspects presented herein may include a number of optimizations for block matching operations by utilizing hardware-friendly procedures at the GPU (e.g., a TP or texture pipeline in a GPU).

Aspects of the present disclosure may use a new window search instruction associated with a block matching operation to accomplish several performance/power benefits at a GPU. In some instances, aspects presented herein may move a window search capability from a shader processor (SP) at a GPU (e.g., shader processors 448/548) to the texture processor (TP) or texture pipeline hardware at a GPU (e.g., texture pipe 424/524). By doing so, this may offload the SP (e.g., shader processors 448/548) to process other types of computations. The range of the block matching search window may be communicated to the TP via extending a sampler memory object (SMO) definition. Also, the best SAD/SSD value and the best 2D coordinates in the search window may be sent (e.g., sent from the TP to the SP) using a register (e.g., a three-wide vector register). For example, the best SAD/SSD value and the best 2D coordinates may be implemented as the following instructions or code:

{
   winningSAD/SSD_result,
   winnerx_position_in_window,
   winner_y_position_in_window
}

Additionally, aspects presented herein may improve GPU performance (e.g., improve performance by up to 4×) by executing multiple block matching operations (e.g., SAD/SSD operations) in parallel by leveraging arithmetic logic units (ALUs) of the TP (e.g., the four color components of TP ALUs). Further, aspects presented herein may improve memory efficiency by unrolling a search loop in an order-friendly fashion to a cache (e.g., unrolling to the TP internal data caching structure). Moreover, aspects presented herein may reduce thrashing inside a cache (e.g., a TP level 1 (L1) cache). For instance, aspects presented herein may reduce thrashing inside a TP L1 cache by allowing the TP to work on a large, localized workload from a single wave, rather than working on multiple small, divergent workloads from several waves.

Figure 7:
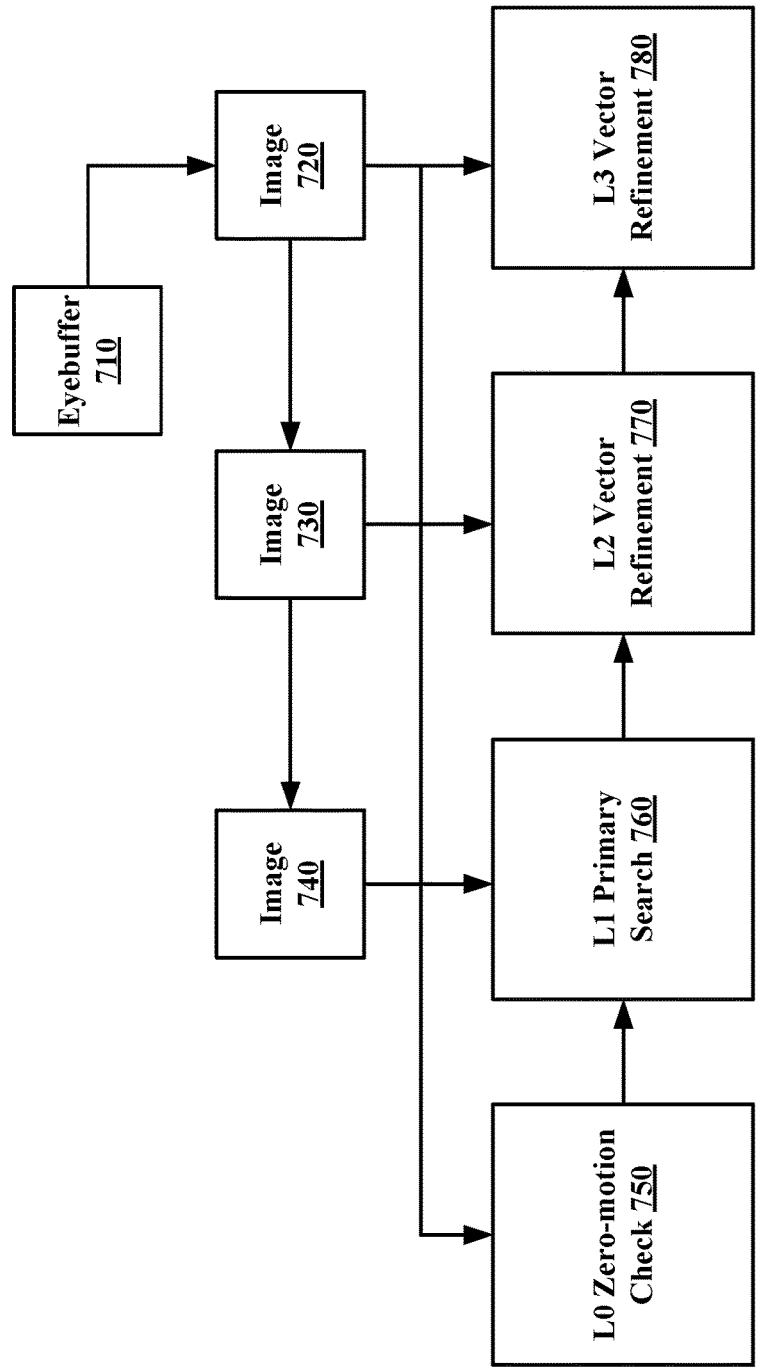
FIG. 7 is a diagram illustrating an example application flow for a block matching feature and a corresponding application.

FIG. 7 includes diagram 700 illustrating an example application flow for a block matching feature and a corresponding application. More specifically, diagram 700 illustrates an application flow for a block matching feature (e.g., an SAD/SSD operation) and a corresponding baseline motion estimation application. As shown in FIG. 7, diagram 700 includes eyebuffer 710 (e.g., eyebuffer for a 1024×1024 image), image 720 (e.g., an image with 512×512 pixels/texels), image 730 (e.g., an image with 256×256 pixels/texels), and image 740 (e.g., an image with 128×128 pixels/texels). FIG. 7 also includes a level 0 (L0) zero-motion check component (e.g., L0 zero-motion check component 750), a level 1 (L1) primary search component (e.g., L1 primary search component 760), a level 2 (L2) vector refinement component (e.g., L2 vector refinement component 770), and a level 3 (L3) vector refinement component (e.g., L3 vector refinement component 780). The L0 zero-motion check component 750 may perform a motion check or zero-motion check on the motion vectors associated with an image. Also, the L1 primary search component 760 may perform a search (e.g., a coarse estimation) on the motion vectors associated with an image. The L2 vector refinement component 770 may refine a direction of motion vectors associated with an image. Further, the L3 vector refinement component 780 may refine a direction of motion vectors associated with an image.

As depicted in FIG. 7, the application flow can start at eyebuffer 710 and move to image 720, image 730, and image 740. Next, the application flow can move from image 720 to L3 vector refinement component 780, move from image 730 to L2 vector refinement component 770, and move from image 740 to L1 primary search component 760. Also, the application flow may move from image 720 to L0 zero-motion check component 750. Next, application flow may move from L0 zero-motion check component 750 to L1 primary search component 760, L2 vector refinement component 770, and L3 vector refinement component 780. As shown in FIG. 7, a performance analysis for the aforementioned block matching feature may be performed on a baseline motion estimation application. The baseline motion estimation application may be running several levels of motion vectors for images. For instance, L1 primary search component 760 may provide a coarse estimation of motion vectors associated with an image. L2 vector refinement component 770 and L3 vector refinement component 780 may refine a direction of motion vectors associated with an image.

Table 1 below shows example performance results for the block matching feature and associated baseline motion estimation application in FIG. 7. For instance, Table 1 shows time spent by the motion estimation application and the associated block matching feature in each level shown in FIG. 7. Note that more than half of the motion estimation application's time is spent in Level 1, which uses the largest search window. This level is bound by TP execution speed of the GPU, which may be increased (e.g., increased by up to 4×) as described in aspects of the present disclosure. By doing so, aspects of the present disclosure may provide a total performance increase for the application at a GPU (e.g., a performance increase of 35% for this application).

TABLE 1

Example performance results

| Work | Time (μs) | Percentage of Total |
|---|---|---|
| Level 0 | 39.715 | 5.66% |
| Level 1 | 361.614 | 51.53% |
| Level 2 | 80.119 | 11.42% |
| Level 3 | 118.269 | 16.85% |
| Other | 102.054 | |
| Total | 701.771 | |

Aspects presented herein may include a number of benefits or advantages. For instance, aspects presented herein may improve the overall performance at a GPU by utilizing the aforementioned block matching features. Aspects presented herein may also reduce a memory throughput at the GPU by utilizing the aforementioned block matching features. Moreover, the aforementioned block matching features may improve the cache hit performance at the GPU. In some instances, aspects of the present disclosure may reduce the amount of performance and/or power utilized at a GPU while executing certain operations (e.g., block matching operations and/or SAD/SSD operations). Aspects of the present disclosure may also utilize different layers of processing for executing block matching operations and/or SAD/SSD operations at a GPU. For instance, aspects presented herein may perform one layer of processing for executing block matching operations and/or SAD/SSD operations at a texture pipeline hardware (e.g., a texture processor (TP)) of a GPU. Further, aspects presented herein may execute multiple SAD and/or SSD operations simultaneously. That is, aspects of the present disclosure may execute multiple SAD and/or SSD operations in parallel. For example, aspects presented herein may execute multiple SAD/SSD operations in parallel by leveraging texture pipeline arithmetic logic units (ALUs). By doing so, aspects presented herein may generate an overall performance improvement at a GPU when executing certain operations (e.g., SAD and/or SSD operations). Aspects presented herein may also cause a power reduction at a GPU when executing certain operations (e.g., block matching operations and/or SAD/SSD operations). Moreover, aspects presented herein may cause a memory throughput reduction at a GPU when executing certain operations (e.g., block matching operations and/or SAD/SSD operations). Also, aspects presented herein may cause a cache hit reduction at a GPU when executing certain operations (e.g., block matching operations and/or SAD/SSD operations).

Figure 8:
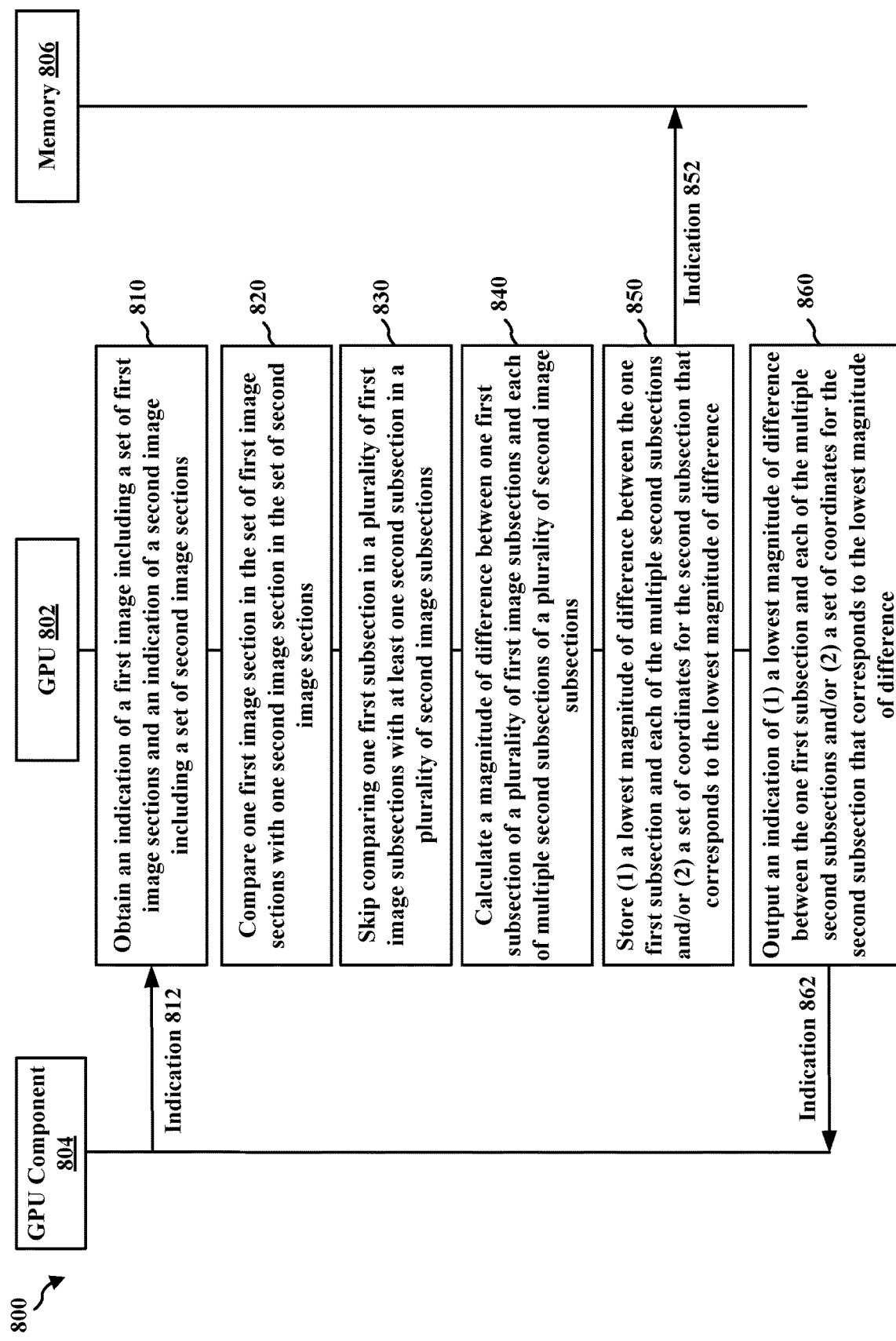
FIG. 8 is a communication flow diagram illustrating example communications between a GPU, a GPU component, and a memory.

FIG. 8 is a communication flow diagram 800 of graphics processing in accordance with one or more techniques of this disclosure. As shown in FIG. 8, diagram 800 includes example communications between GPU 802 (e.g., a GPU, a GPU component, a texture processor (TP) at a GPU, a component in a texture pipeline at a GPU, or other graphics processor), GPU component 804 (e.g., a GPU, a shader processor (SP) at a GPU, an application, or other graphics processor), and memory 806 (e.g., a memory or cache, a cache in a texture pipeline at a GPU, or other a memory or cache at a GPU), in accordance with one or more techniques of this disclosure.

At 810, GPU 802 may obtain a first indication of a first image including a set of first image sections and a second indication of a second image including a set of second image sections (e.g., GPU 802 may obtain indication 812 from GPU component 804), where each of the set of first image sections includes a plurality of first subsections, and where each of the set of second image sections includes a plurality of second subsections. The first indication may include a set of first coordinates for each of the set of first image sections and a size of each of the set of first image sections, and the second indication may include a set of second coordinates for each of the set of second image sections and a size of each of the set of second image sections. In some aspects, obtaining the first indication of the first image including the set of first image sections and the second indication of the second image including the set of second image sections may include: receiving the first indication and the second indication from a shader processor (SP) of a graphics processing unit (GPU). That is, the GPU may receive the first indication and the second indication from an SP (e.g., a TP may receive the indications from an SP). Additionally, the plurality of first subsections may correspond to a plurality of first pixels or a plurality of first texels, and the plurality of second subsections may correspond to a plurality of second pixels or a plurality of second texels.

At 820, GPU 802 may compare one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section. In some aspects, comparing the one first image section in the set of first image sections with the one second image section in the set of second image sections may include: performing a block matching operation for the one first image section and the one second image section. That is, the GPU may perform a block matching operation for the one first image section and the one second image section.

At 830, GPU 802 may skip comparing the one first subsection in the plurality of first subsections with at least one second subsection in the plurality of second subsections. In some aspects, skipping comparing the one first subsection in the plurality of first subsections with the at least one second subsection in the plurality of second subsections may include: performing a sparse traversal operation to skip comparing the one first subsection in the plurality of first subsections with the at least one second subsection in the plurality of second subsections. That is, the GPU may perform a sparse traversal operation to skip comparing the one first subsection in the plurality of first subsections with the at least one second subsection in the plurality of second subsections. Also, the sparse traversal operation may include a step size of the at least one second subsection in the plurality of second subsections, where the sparse traversal operation is performed based on the step size of the at least one second subsection.

At 840, GPU 802 may calculate a magnitude of difference between the one first subsection of the plurality of first subsections and each of the multiple second subsections of the plurality of second subsections. In some aspects, calculating the magnitude of difference between the one first subsection and each of the multiple second subsections may include: calculating the magnitude of difference between the one first subsection and each of the multiple second subsections at a texture processor (TP) of a graphics processing unit (GPU). That is, the GPU may calculate the magnitude of difference between the one first subsection and each of the multiple second subsections at a TP of the GPU. Further, calculating the magnitude of difference between the one first subsection and each of the multiple second subsections at the TP may include: calculating the magnitude of difference between the one first subsection and each of the multiple second subsections with one or more arithmetic logic units (ALUs) at the TP, where the one or more ALUs at the TP are associated with color processing. That is, the GPU may calculate the magnitude of difference between the one first subsection and each of the multiple second subsections with one or more ALUs at the TP, where the one or more ALUs at the TP are associated with color processing. Also, calculating the magnitude of difference between the one first subsection and each of the multiple second subsections may include: calculating the magnitude of difference between the one first subsection and all of the multiple second subsections at a same time or in parallel. That is, the GPU may calculate the magnitude of difference between the one first subsection and all of the multiple second subsections at a same time or in parallel. In some aspects, calculating the magnitude of difference between the one first subsection and each of the multiple second subsections may include: performing a sum of absolute differences (SAD) operation or a sum of squared differences (SSD) operation between the one first subsection and each of the multiple second subsections. That is, the GPU may perform a SAD operation or a SSD operation between the one first subsection and each of the multiple second subsections.

At 850, GPU 802 may store, prior to outputting a third indication, at least one of: (1) a lowest magnitude of difference between the one first subsection of the plurality of first subsections and each of the multiple second subsections of the plurality of second subsections or (2) a set of coordinates for the second subsection in the multiple second subsections of the plurality of second subsections that corresponds to the lowest magnitude of difference (e.g., GPU 802 may store indication 852 in memory 806). In some aspects, the lowest magnitude of difference and/or the set of coordinates for the second subsection may be stored in a GPU memory, a GPU cache, and/or a texture pipeline cache.

At 860, GPU 802 may output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference (e.g., GPU 802 may output indication 862 to GPU component 804). In some aspects, outputting the third indication of at least one of: (1) the lowest magnitude of difference between the one first subsection and each of the multiple second subsections or (2) the set of coordinates for the second subsection that corresponds to the lowest magnitude of difference may include: transmitting the third indication via a color channel bus of a graphics processing unit (GPU). That is, the GPU may transmit the third indication via a color channel bus of the GPU. Also, transmitting the third indication via the color channel bus of the GPU may include: transmitting the third indication via a set of color channel coordinates of the color channel bus. That is, the GPU may transmit the third indication via a set of color channel coordinates of the color channel bus. In some instances, outputting the third indication of at least one of: (1) the lowest magnitude of difference between the one first subsection and each of the multiple second subsections or (2) the set of coordinates for the second subsection that corresponds to the lowest magnitude of difference may include: transmitting the third indication to a shader processor (SP) of a graphics processing unit (GPU). That is, the GPU may transmit the third indication to a shader processor.

Figure 9:
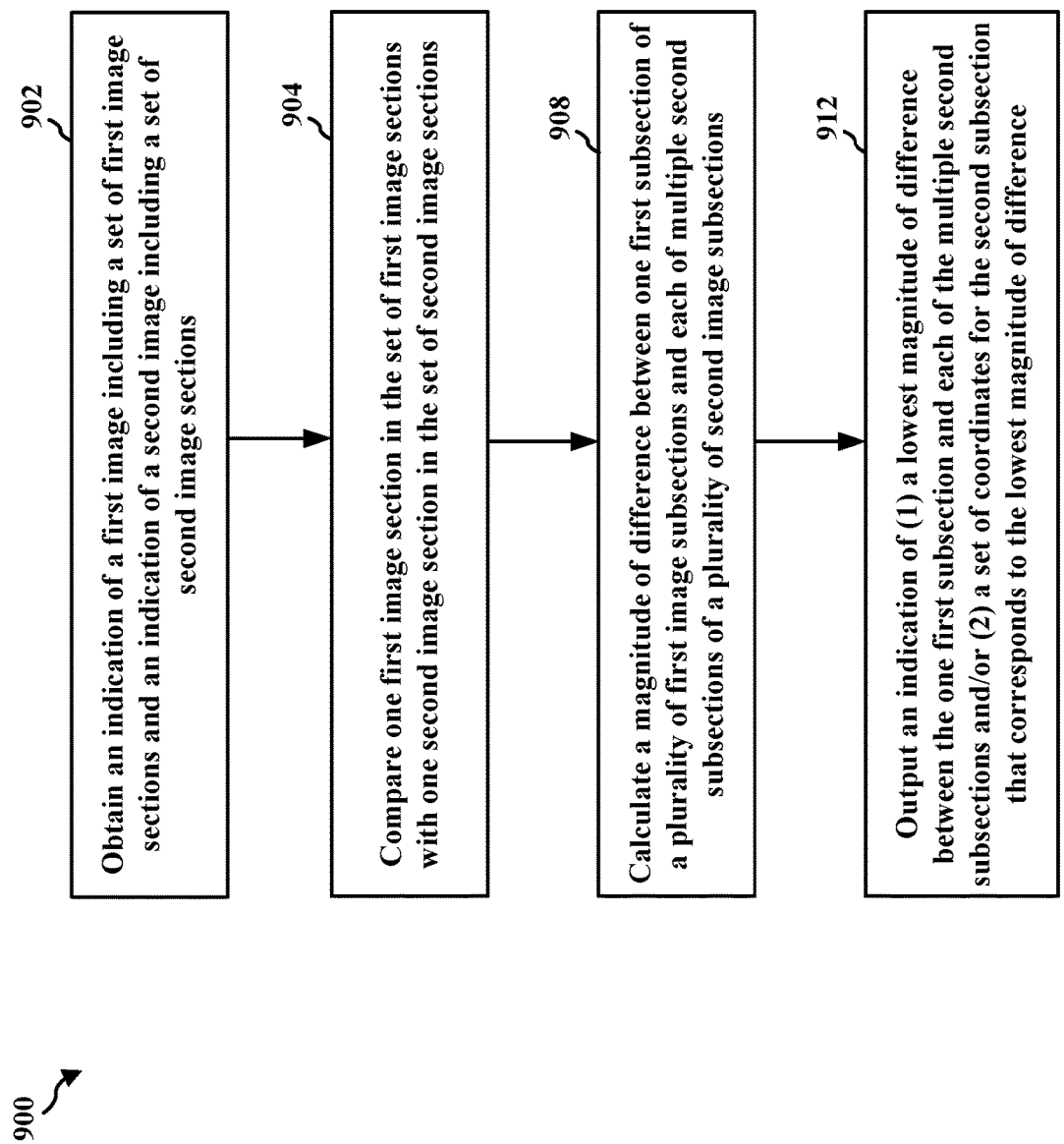
FIG. 9 is a flowchart of an example method of graphics processing.

FIG. 9 is a flowchart 900 of an example method of display processing in accordance with one or more techniques of this disclosure. The method may be performed by a GPU (e.g., a GPU component, a texture processor (TP) at a GPU, a component in a texture pipeline at a GPU, or other graphics processor), a CPU (or other central processor), a DDIC, an apparatus for graphics processing, a wireless communication device, and/or any apparatus that may perform graphics processing as used in connection with the examples of FIGS. 1-8.

At 902, the GPU may obtain a first indication of a first image including a set of first image sections and a second indication of a second image including a set of second image sections, where each of the set of first image sections includes a plurality of first subsections, and where each of the set of second image sections includes a plurality of second subsections, as described in connection with the examples in FIGS. 1-8. For example, as described in 810 of FIG. 8, GPU 802 may obtain a first indication of a first image including a set of first image sections and a second indication of a second image including a set of second image sections, where each of the set of first image sections includes a plurality of first subsections, and where each of the set of second image sections includes a plurality of second subsections. Further, step 902 may be performed by processing unit 120 in FIG. 1. The first indication may include a set of first coordinates for each of the set of first image sections and a size of each of the set of first image sections, and the second indication may include a set of second coordinates for each of the set of second image sections and a size of each of the set of second image sections. In some aspects, obtaining the first indication of the first image including the set of first image sections and the second indication of the second image including the set of second image sections may include: receiving the first indication and the second indication from a shader processor (SP) of a graphics processing unit (GPU). That is, the GPU may receive the first indication and the second indication from an SP (e.g., a TP may receive the indications from an SP). Additionally, the plurality of first subsections may correspond to a plurality of first pixels or a plurality of first texels, and the plurality of second subsections may correspond to a plurality of second pixels or a plurality of second texels.

At 904, the GPU may compare one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section, as described in connection with the examples in FIGS. 1-8. For example, as described in 820 of FIG. 8, GPU 802 may compare one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section. Further, step 904 may be performed by processing unit 120 in FIG. 1. In some aspects, comparing the one first image section in the set of first image sections with the one second image section in the set of second image sections may include: performing a block matching operation for the one first image section and the one second image section. That is, the GPU may perform a block matching operation for the one first image section and the one second image section.

At 908, the GPU may calculate a magnitude of difference between the one first subsection of the plurality of first subsections and each of the multiple second subsections of the plurality of second subsections, as described in connection with the examples in FIGS. 1-8. For example, as described in 840 of FIG. 8, GPU 802 may calculate a magnitude of difference between the one first subsection of the plurality of first subsections and each of the multiple second subsections of the plurality of second subsections. Further, step 908 may be performed by processing unit 120 in FIG. 1. In some aspects, calculating the magnitude of difference between the one first subsection and each of the multiple second subsections may include: calculating the magnitude of difference between the one first subsection and each of the multiple second subsections at a texture processor (TP) of a graphics processing unit (GPU). That is, the GPU may calculate the magnitude of difference between the one first subsection and each of the multiple second subsections at a TP of the GPU. Further, calculating the magnitude of difference between the one first subsection and each of the multiple second subsections at the TP may include: calculating the magnitude of difference between the one first subsection and each of the multiple second subsections with one or more arithmetic logic units (ALUs) at the TP, where the one or more ALUs at the TP are associated with color processing. That is, the GPU may calculate the magnitude of difference between the one first subsection and each of the multiple second subsections with one or more ALUs at the TP, where the one or more ALUs at the TP are associated with color processing. Also, calculating the magnitude of difference between the one first subsection and each of the multiple second subsections may include: calculating the magnitude of difference between the one first subsection and all of the multiple second subsections at a same time or in parallel. That is, the GPU may calculate the magnitude of difference between the one first subsection and all of the multiple second subsections at a same time or in parallel. In some aspects, calculating the magnitude of difference between the one first subsection and each of the multiple second subsections may include: performing a sum of absolute differences (SAD) operation or a sum of squared differences (SSD) operation between the one first subsection and each of the multiple second subsections. That is, the GPU may perform a SAD operation or a SSD operation between the one first subsection and each of the multiple second subsections.

At 912, the GPU may output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference, as described in connection with the examples in FIGS. 1-8. For example, as described in 860 of FIG. 8, GPU 802 may output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference. Further, step 912 may be performed by processing unit 120 in FIG. 1. In some aspects, outputting the third indication of at least one of: (1) the lowest magnitude of difference between the one first subsection and each of the multiple second subsections or (2) the set of coordinates for the second subsection that corresponds to the lowest magnitude of difference may include: transmitting the third indication via a color channel bus of a graphics processing unit (GPU). That is, the GPU may transmit the third indication via a color channel bus of the GPU. Also, transmitting the third indication via the color channel bus of the GPU may include: transmitting the third indication via a set of color channel coordinates of the color channel bus. That is, the GPU may transmit the third indication via a set of color channel coordinates of the color channel bus. In some instances, outputting the third indication of at least one of: (1) the lowest magnitude of difference between the one first subsection and each of the multiple second subsections or (2) the set of coordinates for the second subsection that corresponds to the lowest magnitude of difference may include: transmitting the third indication to a shader processor (SP) of a graphics processing unit (GPU). That is, the GPU may transmit the third indication to a shader processor.

Figure 10:
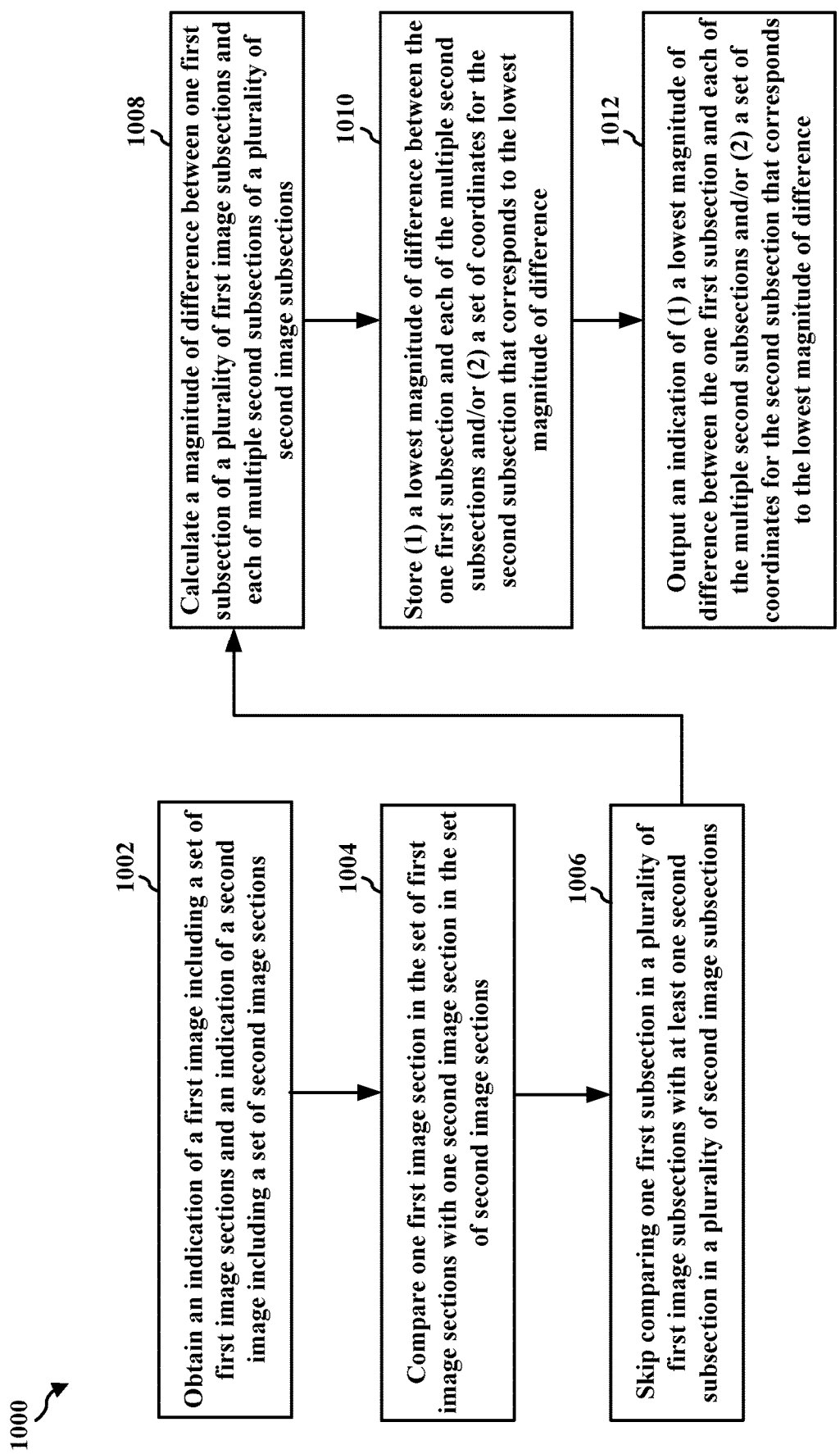
FIG. 10 is a flowchart of an example method of graphics processing.

FIG. 10 is a flowchart 1000 of an example method of display processing in accordance with one or more techniques of this disclosure. The method may be performed by a GPU (e.g., a GPU component, a texture processor (TP) at a GPU, a component in a texture pipeline at a GPU, or other graphics processor), a CPU (or other central processor), a DDIC, an apparatus for graphics processing, a wireless communication device, and/or any apparatus that may perform graphics processing as used in connection with the examples of FIGS. 1-8.

At 1002, the GPU may obtain a first indication of a first image including a set of first image sections and a second indication of a second image including a set of second image sections, where each of the set of first image sections includes a plurality of first subsections, and where each of the set of second image sections includes a plurality of second subsections, as described in connection with the examples in FIGS. 1-8. For example, as described in 810 of FIG. 8, GPU 802 may obtain a first indication of a first image including a set of first image sections and a second indication of a second image including a set of second image sections, where each of the set of first image sections includes a plurality of first subsections, and where each of the set of second image sections includes a plurality of second subsections. Further, step 1002 may be performed by processing unit 120 in FIG. 1. The first indication may include a set of first coordinates for each of the set of first image sections and a size of each of the set of first image sections, and the second indication may include a set of second coordinates for each of the set of second image sections and a size of each of the set of second image sections. In some aspects, obtaining the first indication of the first image including the set of first image sections and the second indication of the second image including the set of second image sections may include: receiving the first indication and the second indication from a shader processor (SP) of a graphics processing unit (GPU). That is, the GPU may receive the first indication and the second indication from an SP (e.g., a TP may receive the indications from an SP). Additionally, the plurality of first subsections may correspond to a plurality of first pixels or a plurality of first texels, and the plurality of second subsections may correspond to a plurality of second pixels or a plurality of second texels.

At 1004, the GPU may compare one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section, as described in connection with the examples in FIGS. 1-8. For example, as described in 820 of FIG. 8, GPU 802 may compare one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section. Further, step 1004 may be performed by processing unit 120 in FIG. 1. In some aspects, comparing the one first image section in the set of first image sections with the one second image section in the set of second image sections may include: performing a block matching operation for the one first image section and the one second image section. That is, the GPU may perform a block matching operation for the one first image section and the one second image section.

At 1006, the GPU may skip comparing the one first subsection in the plurality of first subsections with at least one second subsection in the plurality of second subsections, as described in connection with the examples in FIGS. 1-8. For example, as described in 830 of FIG. 8, GPU 802 may skip comparing the one first subsection in the plurality of first subsections with at least one second subsection in the plurality of second subsections. Further, step 1006 may be performed by processing unit 120 in FIG. 1. In some aspects, skipping comparing the one first subsection in the plurality of first subsections with the at least one second subsection in the plurality of second subsections may include: performing a sparse traversal operation to skip comparing the one first subsection in the plurality of first subsections with the at least one second subsection in the plurality of second subsections. That is, the GPU may perform a sparse traversal operation to skip comparing the one first subsection in the plurality of first subsections with the at least one second subsection in the plurality of second subsections. Also, the sparse traversal operation may include a step size of the at least one second subsection in the plurality of second subsections, where the sparse traversal operation is performed based on the step size of the at least one second subsection.

At 1008, the GPU may calculate a magnitude of difference between the one first subsection of the plurality of first subsections and each of the multiple second subsections of the plurality of second subsections, as described in connection with the examples in FIGS. 1-8. For example, as described in 840 of FIG. 8, GPU 802 may calculate a magnitude of difference between the one first subsection of the plurality of first subsections and each of the multiple second subsections of the plurality of second subsections. Further, step 1008 may be performed by processing unit 120 in FIG. 1. In some aspects, calculating the magnitude of difference between the one first subsection and each of the multiple second subsections may include: calculating the magnitude of difference between the one first subsection and each of the multiple second subsections at a texture processor (TP) of a graphics processing unit (GPU). That is, the GPU may calculate the magnitude of difference between the one first subsection and each of the multiple second subsections at a TP of the GPU. Further, calculating the magnitude of difference between the one first subsection and each of the multiple second subsections at the TP may include: calculating the magnitude of difference between the one first subsection and each of the multiple second subsections with one or more arithmetic logic units (ALUs) at the TP, where the one or more ALUs at the TP are associated with color processing. That is, the GPU may calculate the magnitude of difference between the one first subsection and each of the multiple second subsections with one or more ALUs at the TP, where the one or more ALUs at the TP are associated with color processing. Also, calculating the magnitude of difference between the one first subsection and each of the multiple second subsections may include: calculating the magnitude of difference between the one first subsection and all of the multiple second subsections at a same time or in parallel. That is, the GPU may calculate the magnitude of difference between the one first subsection and all of the multiple second subsections at a same time or in parallel. In some aspects, calculating the magnitude of difference between the one first subsection and each of the multiple second subsections may include: performing a sum of absolute differences (SAD) operation or a sum of squared differences (SSD) operation between the one first subsection and each of the multiple second subsections. That is, the GPU may perform a SAD operation or a SSD operation between the one first subsection and each of the multiple second subsections.

At 1010, the GPU may store, prior to outputting a third indication, at least one of: (1) a lowest magnitude of difference between the one first subsection of the plurality of first subsections and each of the multiple second subsections of the plurality of second subsections or (2) a set of coordinates for the second subsection in the multiple second subsections of the plurality of second subsections that corresponds to the lowest magnitude of difference, as described in connection with the examples in FIGS. 1-8. For example, as described in 850 of FIG. 8, GPU 802 may store, prior to outputting a third indication, at least one of: (1) a lowest magnitude of difference between the one first subsection of the plurality of first subsections and each of the multiple second subsections of the plurality of second subsections or (2) a set of coordinates for the second subsection in the multiple second subsections of the plurality of second subsections that corresponds to the lowest magnitude of difference. Further, step 1010 may be performed by processing unit 120 in FIG. 1. In some aspects, the lowest magnitude of difference and/or the set of coordinates for the second subsection may be stored in a GPU memory, a GPU cache, and/or a texture pipeline cache.

At 1012, the GPU may output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference, as described in connection with the examples in FIGS. 1-8. For example, as described in 860 of FIG. 8, GPU 802 may output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference. Further, step 1012 may be performed by processing unit 120 in FIG. 1. In some aspects, outputting the third indication of at least one of: (1) the lowest magnitude of difference between the one first subsection and each of the multiple second subsections or (2) the set of coordinates for the second subsection that corresponds to the lowest magnitude of difference may include: transmitting the third indication via a color channel bus of a graphics processing unit (GPU). That is, the GPU may transmit the third indication via a color channel bus of the GPU. Also, transmitting the third indication via the color channel bus of the GPU may include: transmitting the third indication via a set of color channel coordinates of the color channel bus. That is, the GPU may transmit the third indication via a set of color channel coordinates of the color channel bus. In some instances, outputting the third indication of at least one of: (1) the lowest magnitude of difference between the one first subsection and each of the multiple second subsections or (2) the set of coordinates for the second subsection that corresponds to the lowest magnitude of difference may include: transmitting the third indication to a shader processor (SP) of a graphics processing unit (GPU). That is, the GPU may transmit the third indication to a shader processor.

In configurations, a method or an apparatus for display processing is provided. The apparatus may be a GPU (or other graphics processor), a CPU (or other central processor), a DDIC, an apparatus for graphics processing, and/or some other processor that may perform graphics processing. In aspects, the apparatus may be the processing unit 120 within the device 104, or may be some other hardware within the device 104 or another device. The apparatus, e.g., processing unit 120, may include means for obtaining a first indication of a first image including a set of first image sections and a second indication of a second image including a set of second image sections, where each of the set of first image sections includes a plurality of first subsections, and where each of the set of second image sections includes a plurality of second subsections. The apparatus, e.g., processing unit 120, may also include means for comparing one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section. The apparatus, e.g., processing unit 120, may also include means for calculating a magnitude of difference between the one first subsection of the plurality of first subsections and each of the multiple second subsections of the plurality of second subsections. The apparatus, e.g., processing unit 120, may also include means for outputting a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference. The apparatus, e.g., processing unit 120, may also include means for storing, prior to outputting the third indication, at least one of: (1) the lowest magnitude of difference between the one first subsection of the plurality of first subsections and each of the multiple second subsections of the plurality of second subsections or (2) the set of coordinates for the second subsection in the multiple second subsections of the plurality of second subsections that corresponds to the lowest magnitude of difference. The apparatus, e.g., processing unit 120, may also include means for skipping comparing the one first subsection in the plurality of first subsections with at least one second subsection in the plurality of second subsections.

The subject matter described herein may be implemented to realize one or more benefits or advantages. For instance, the described graphics processing techniques may be used by a GPU, a CPU, a central processor, or some other processor that may perform graphics processing to implement the block matching techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize block matching techniques in order to improve memory bandwidth efficiency and/or increase processing speed at a GPU, a CPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term- "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including a memory and at least one processor coupled to the memory and, based at least in part on information stored in the memory, the at least one processor is configured to: obtain a first indication of a first image including a set of first image sections and a second indication of a second image including a set of second image sections, where each of the set of first image sections includes a plurality of first subsections, and where each of the set of second image sections includes a plurality of second subsections; compare one first image section in the set of first image sections with one second image section in the set of second image sections, where the one first image section is positioned at different locations when compared with the one second image section, such that one first subsection of the plurality of first subsections in the one first image section is compared with multiple second subsections of the plurality of second subsections in the one second image section; calculate a magnitude of difference between the one first subsection of the plurality of first subsections and each of the multiple second subsections of the plurality of second subsections; and output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference.

Aspect 2 is the apparatus of aspect 1, where to calculate the magnitude of difference between the one first subsection and each of the multiple second subsections, the at least one processor is configured to: calculate the magnitude of difference between the one first subsection and each of the multiple second subsections at a texture processor (TP) of a graphics processing unit (GPU).

Aspect 3 is the apparatus of aspect 2, where to calculate the magnitude of difference between the one first subsection and each of the multiple second subsections, the at least one processor is configured to: calculate the magnitude of difference between the one first subsection and each of the multiple second subsections with one or more arithmetic logic units (ALUs) at the TP, where the one or more ALUs at the TP are associated with color processing.

Aspect 4 is the apparatus of any of aspects 1 to 3, where to calculate the magnitude of difference between the one first subsection and each of the multiple second subsections, the at least one processor is configured to: calculate the magnitude of difference between the one first subsection and all of the multiple second subsections at a same time.

Aspect 5 is the apparatus of any of aspects 1 to 4, where the at least one processor is further configured to: store, prior to being configured to output the third indication, at least one of: (1) the lowest magnitude of difference between the one first subsection of the plurality of first subsections and each of the multiple second subsections of the plurality of second subsections or (2) the set of coordinates for the second subsection in the multiple second subsections of the plurality of second subsections that corresponds to the lowest magnitude of difference.

Aspect 6 is the apparatus of any of aspects 1 to 5, where to output the third indication of at least one of: (1) the lowest magnitude of difference between the one first subsection and each of the multiple second subsections or (2) the set of coordinates for the second subsection that corresponds to the lowest magnitude of difference, the at least one processor is configured to: transmit the third indication via a color channel bus of a graphics processing unit (GPU).

Aspect 7 is the apparatus of aspect 6, where to transmit the third indication via the color channel bus of the GPU, the at least one processor is configured to: transmit the third indication via a set of color channel coordinates of the color channel bus.

Aspect 8 is the apparatus of any of aspects 1 to 7, where to output the third indication of at least one of: (1) the lowest magnitude of difference between the one first subsection and each of the multiple second subsections or (2) the set of coordinates for the second subsection that corresponds to the lowest magnitude of difference, the at least one processor is configured to: transmit the third indication to a shader processor (SP) of a graphics processing unit (GPU).

Aspect 9 is the apparatus of any of aspects 1 to 8, where the at least one processor is further configured to: skip comparing the one first subsection in the plurality of first subsections with at least one second subsection in the plurality of second subsections.

Aspect 10 is the apparatus of aspect 9, where to skip comparing the one first subsection in the plurality of first subsections with the at least one second subsection in the plurality of second subsections, the at least one processor is configured to: perform a sparse traversal operation to skip comparing the one first subsection in the plurality of first subsections with the at least one second subsection in the plurality of second subsections.

Aspect 11 is the apparatus of any of aspects 9 or 10, where the sparse traversal operation includes a step size of the at least one second subsection in the plurality of second subsections, where the at least one processor is configured to perform the sparse traversal operation based on the step size of the at least one second subsection.

Aspect 12 is the apparatus of any of aspects 1 to 11, where to compare the one first image section in the set of first image sections with the one second image section in the set of second image sections, the at least one processor is configured to: perform a block matching operation for the one first image section and the one second image section.

Aspect 13 is the apparatus of any of aspects 1 to 12, where to calculate the magnitude of difference between the one first subsection and each of the multiple second subsections, the at least one processor is configured to: perform a sum of absolute differences (SAD) operation or a sum of squared differences (SSD) operation between the one first subsection and each of the multiple second subsections.

Aspect 14 is the apparatus of any of aspects 1 to 13, where the first indication includes a set of first coordinates for each of the set of first image sections and a size of each of the set of first image sections, and where the second indication includes a set of second coordinates for each of the set of second image sections and a size of each of the set of second image sections.

Aspect 15 is the apparatus of any of aspects 1 to 14, where to obtain the first indication of the first image including the set of first image sections and the second indication of the second image including the set of second image sections, the at least one processor is configured to: receive the first indication and the second indication from a shader processor (SP) of a graphics processing unit (GPU).

Aspect 16 is the apparatus of any of aspects 1 to 15, further including at least one of an antenna or a transceiver coupled to the at least one processor, where to output the third indication, the at least one processor is configured to transmit the third indication via at least one of the antenna or the transceiver, and where the plurality of first subsections corresponds to a plurality of first pixels or a plurality of first texels, and where the plurality of second subsections corresponds to a plurality of second pixels or a plurality of second texels.

Aspect 17 is a method of graphics processing for implementing any of aspects 1 to 16.

Aspect 18 is an apparatus for graphics processing including means for implementing any of aspects 1 to 16.

Aspect 19 is a computer-readable medium (e.g., a non-transitory computer-readable medium) storing computer executable code, the code when executed by at least one processor causes the at least one processor to implement any of aspects 1 to 16.

What is claimed is:

1. An apparatus for graphics processing, comprising:
a memory; and
at least one processor coupled to the memory and, based at least in part on information stored in the memory, the at least one processor is configured to:
obtain a first indication of a first image including a set of first image sections and a second indication of a second image including a set of second image sections, wherein each of the set of first image sections includes a plurality of first subsections, and wherein each of the set of second image sections includes a plurality of second subsections;
compare one first image section in the set of first image sections with one second image section in the set of second image sections, wherein the one first image section is positioned at different locations when compared with the one second image section, such that one first subsection of the plurality of first subsections in the one first image section is compared with multiple second subsections of the plurality of second subsections in the one second image section;
calculate a magnitude of difference between the one first subsection of the plurality of first subsections and each of the multiple second subsections of the plurality of second subsections;
output a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference to reduce memory throughput and improve performance of a graphics processing unit (GPU); and
skip comparing the one first subsection in the plurality of first subsections with at least one second subsection in the plurality of second subsections.

2. The apparatus of claim 1, wherein to calculate the magnitude of difference between the one first subsection and each of the multiple second subsections, the at least one processor is configured to: calculate the magnitude of difference between the one first subsection and each of the multiple second subsections at a texture processor (TP) of a graphics processing unit (GPU).

3. The apparatus of claim 2, wherein to calculate the magnitude of difference between the one first subsection and each of the multiple second subsections, the at least one processor is configured to: calculate the magnitude of difference between the one first subsection and each of the multiple second subsections with one or more arithmetic logic units (ALUs) at the TP, wherein the one or more ALUs at the TP are associated with color processing.

4. The apparatus of claim 1, wherein to calculate the magnitude of difference between the one first subsection and each of the multiple second subsections, the at least one processor is configured to: calculate the magnitude of difference between the one first subsection and all of the multiple second subsections at a same time.

5. The apparatus of claim 1, wherein the at least one processor is further configured to:
store, prior to being configured to output the third indication, at least one of: (1) the lowest magnitude of difference between the one first subsection of the plurality of first subsections and each of the multiple second subsections of the plurality of second subsections or (2) the set of coordinates for the second subsection in the multiple second subsections of the plurality of second subsections that corresponds to the lowest magnitude of difference.

6. The apparatus of claim 1, wherein to output the third indication of at least one of: (1) the lowest magnitude of difference between the one first subsection and each of the multiple second subsections or (2) the set of coordinates for the second subsection that corresponds to the lowest magnitude of difference, the at least one processor is configured to: transmit the third indication via a color channel bus of a graphics processing unit (GPU).

7. The apparatus of claim 6, wherein to transmit the third indication via the color channel bus of the GPU, the at least one processor is configured to: transmit the third indication via a set of color channel coordinates of the color channel bus.

8. The apparatus of claim 1, wherein to output the third indication of at least one of: (1) the lowest magnitude of difference between the one first subsection and each of the multiple second subsections or (2) the set of coordinates for the second subsection that corresponds to the lowest magnitude of difference, the at least one processor is configured to: transmit the third indication to a shader processor (SP) of a graphics processing unit (GPU).

9. The apparatus of claim 1, wherein to skip comparing the one first subsection in the plurality of first subsections with the at least one second subsection in the plurality of second subsections, the at least one processor is configured to: perform a sparse traversal operation to skip comparing the one first subsection in the plurality of first subsections with the at least one second subsection in the plurality of second subsections.

10. The apparatus of claim 9, wherein the sparse traversal operation includes a step size of the at least one second subsection in the plurality of second subsections, wherein the at least one processor is configured to perform the sparse traversal operation based on the step size of the at least one second subsection.

11. The apparatus of claim 1, wherein to compare the one first image section in the set of first image sections with the one second image section in the set of second image sections, the at least one processor is configured to: perform a block matching operation for the one first image section and the one second image section.

12. The apparatus of claim 1, wherein to calculate the magnitude of difference between the one first subsection and each of the multiple second subsections, the at least one processor is configured to: perform a sum of absolute differences (SAD) operation or a sum of squared differences (SSD) operation between the one first subsection and each of the multiple second subsections.

13. The apparatus of claim 1, wherein the first indication includes a set of first coordinates for each of the set of first image sections and a size of each of the set of first image sections, and wherein the second indication includes a set of second coordinates for each of the set of second image sections and a size of each of the set of second image sections.

14. The apparatus of claim 1, wherein to obtain the first indication of the first image including the set of first image sections and the second indication of the second image including the set of second image sections, the at least one processor is configured to: receive the first indication and the second indication from a shader processor (SP) of a graphics processing unit (GPU).

15. The apparatus of claim 1, further comprising a transceiver coupled to the at least one processor, wherein to output the third indication, the at least one processor is configured to transmit the third indication via the transceiver, wherein the plurality of first subsections corresponds to a plurality of first pixels or a plurality of first texels, and wherein the plurality of second subsections corresponds to a plurality of second pixels or a plurality of second texels.

16. A method of graphics processing, comprising:
obtaining a first indication of a first image including a set of first image sections and a second indication of a second image including a set of second image sections, wherein each of the set of first image sections includes a plurality of first subsections, and wherein each of the set of second image sections includes a plurality of second subsections;
comparing one first image section in the set of first image sections with one second image section in the set of second image sections, wherein the one first image section is positioned at different locations when compared with the one second image section, such that one first subsection of the plurality of first subsections in the one first image section is compared with multiple second subsections of the plurality of second subsections in the one second image section;
calculating a magnitude of difference between the one first subsection of the plurality of first subsections and each of the multiple second subsections of the plurality of second subsections;
outputting a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference to reduce memory throughput and improve performance of a graphics processing unit (GPU); and
skipping comparing the one first subsection in the plurality of first subsections with at least one second subsection in the plurality of second subsections.

17. The method of claim 16, wherein calculating the magnitude of difference between the one first subsection and each of the multiple second subsections comprises: calculating the magnitude of difference between the one first subsection and each of the multiple second subsections at a texture processor (TP) of a graphics processing unit (GPU).

18. The method of claim 17, wherein calculating the magnitude of difference between the one first subsection and each of the multiple second subsections at the TP comprises: calculating the magnitude of difference between the one first subsection and each of the multiple second subsections with one or more arithmetic logic units (ALUs) at the TP, wherein the one or more ALUs at the TP are associated with color processing.

19. The method of claim 16, wherein calculating the magnitude of difference between the one first subsection and each of the multiple second subsections comprises: calculating the magnitude of difference between the one first subsection and all of the multiple second subsections at a same time.

20. The method of claim 16, further comprising:
storing, prior to outputting the third indication, at least one of: (1) the lowest magnitude of difference between the one first subsection of the plurality of first subsections and each of the multiple second subsections of the plurality of second subsections or (2) the set of coordinates for the second subsection in the multiple second subsections of the plurality of second subsections that corresponds to the lowest magnitude of difference.

21. The method of claim 16, wherein outputting the third indication of at least one of: (1) the lowest magnitude of difference between the one first subsection and each of the multiple second subsections or (2) the set of coordinates for the second subsection that corresponds to the lowest magnitude of difference comprises: transmitting the third indication via a color channel bus of a graphics processing unit (GPU), wherein transmitting the third indication via the color channel bus of the GPU comprises: transmitting the third indication via a set of color channel coordinates of the color channel bus.

22. The method of claim 16, wherein outputting the third indication of at least one of: (1) the lowest magnitude of difference between the one first subsection and each of the multiple second subsections or (2) the set of coordinates for the second subsection that corresponds to the lowest magnitude of difference comprises: transmitting the third indication to a shader processor (SP) of a graphics processing unit (GPU).

23. The method of claim 16, wherein skipping comparing the one first subsection in the plurality of first subsections with the at least one second subsection in the plurality of second subsections comprises: performing a sparse traversal operation to skip comparing the one first subsection in the plurality of first subsections with the at least one second subsection in the plurality of second subsections, wherein the sparse traversal operation includes a step size of the at least one second subsection in the plurality of second subsections, wherein the sparse traversal operation is performed based on the step size of the at least one second subsection.

24. The method of claim 16, wherein comparing the one first image section in the set of first image sections with the one second image section in the set of second image sections comprises: performing a block matching operation for the one first image section and the one second image section.

25. The method of claim 16, wherein calculating the magnitude of difference between the one first subsection and each of the multiple second subsections comprises: performing a sum of absolute differences (SAD) operation or a sum of squared differences (SSD) operation between the one first subsection and each of the multiple second subsections, wherein the first indication includes a set of first coordinates for each of the set of first image sections and a size of each of the set of first image sections, and wherein the second indication includes a set of second coordinates for each of the set of second image sections and a size of each of the set of second image sections.

26. The method of claim 16, wherein obtaining the first indication of the first image including the set of first image sections and the second indication of the second image including the set of second image sections comprises: receiving the first indication and the second indication from a shader processor (SP) of a graphics processing unit (GPU), wherein the plurality of first subsections corresponds to a plurality of first pixels or a plurality of first texels, and wherein the plurality of second subsections corresponds to a plurality of second pixels or a plurality of second texels.

27. An apparatus for graphics processing, comprising:
means for obtaining a first indication of a first image including a set of first image sections and a second indication of a second image including a set of second image sections, wherein each of the set of first image sections includes a plurality of first subsections, and wherein each of the set of second image sections includes a plurality of second subsections;
means for comparing one first image section in the set of first image sections with one second image section in the set of second image sections, wherein the one first image section is positioned at different locations when compared with the one second image section, such that one first subsection of the plurality of first subsections in the one first image section is compared with multiple second subsections of the plurality of second subsections in the one second image section;
means for calculating a magnitude of difference between the one first subsection of the plurality of first subsections and each of the multiple second subsections of the plurality of second subsections;
means for outputting a third indication of at least one of: (1) a lowest magnitude of difference between the one first subsection of the plurality of first subsections and each of the multiple second subsections of the plurality of second subsections or (2) a set of coordinates for a second subsection in the multiple second subsections of the plurality of second subsections that corresponds to the lowest magnitude of difference to reduce memory throughput and improve performance of a graphics processing unit (GPU); and
means for skipping comparing the one first subsection in the plurality of first subsections with at least one second subsection in the plurality of second subsections.

* * * * *